(12) United States Patent
Tokumo et al.

(10) Patent No.: US 8,479,866 B2
(45) Date of Patent: Jul. 9, 2013

(54) OPERATIONAL PEDAL SUPPORT STRUCTURE OF AUTOMOTIVE VEHICLE

(75) Inventors: Masayuki Tokumo, Hiroshima (JP); Yoh Yamazaki, Hiroshima (JP)

(73) Assignee: Mazda Motor Corporation (JP)

( * ) Notice: Subject to any disclaimer, the term of this patent is extended or adjusted under 35 U.S.C. 154(b) by 275 days.

(21) Appl. No.: 12/839,009

(22) Filed: Jul. 19, 2010

(65) Prior Publication Data

US 2011/0030500 A1    Feb. 10, 2011

(30) Foreign Application Priority Data

Aug. 7, 2009  (JP) ................ 2009-184393
Aug. 7, 2009  (JP) ................ 2009-184394

(51) Int. Cl.
*B60K 28/10* (2006.01)

(52) U.S. Cl.
USPC ........................... 180/274; 74/512

(58) Field of Classification Search
USPC .......................... 180/274; 74/512
See application file for complete search history.

(56) References Cited

U.S. PATENT DOCUMENTS

| | | | |
|---|---|---|---|
| 7,568,545 B2 * | 8/2009 | Tanigawa et al. | 180/274 |
| 2006/0162481 A1 | 7/2006 | Sato | |
| 2009/0250285 A1 | 10/2009 | Allen et al. | |

FOREIGN PATENT DOCUMENTS

| | | |
|---|---|---|
| EP | 1 323 602 A1 | 7/2003 |
| EP | 1 533 202 A1 | 5/2005 |
| JP | 2006-139345 A | 6/2006 |
| JP | 2008-077150 A | 4/2008 |
| WO | WO 03/045750 A1 | 6/2003 |

OTHER PUBLICATIONS

The extended European Search Report dated Sep. 20, 2010; Application No. 10007675.1-1252.

* cited by examiner

*Primary Examiner* — Eric Culbreth
(74) *Attorney, Agent, or Firm* — Studebaker & Brackett PC

(57) ABSTRACT

An operational pedal support structure of an automotive vehicle comprises a fixed pedal support member on the side of a dash panel, a swing pedal support member, a pedal body supported at the swing pedal support member via a first pivotal axis, a holding portion to allow a downward move of the first pivotal axis only in case the rotational lever rotates, and a pressing portion provided at the rotational lever so as to press down the swing pedal support member. The pressing portion is positioned in front of the second pivotal axis. Accordingly, the operational pedal support structure of an automotive vehicle equipped with a means mechanism for compulsively moving down the pedal at the vehicle frontal collision, which can be made compact and simple with a high reliability, can be provided.

15 Claims, 19 Drawing Sheets

OPERATIONAL PEDAL SUPPORT STRUCTURE OF AUTOMOTIVE VEHICLE

BACKGROUND OF THE INVENTION

The present invention relates to an operational pedal support structure of an automotive vehicle which can restrain a rearward move of a pedal pressing face (so-called pedal pad) of an operational pedal provided in back of a dash panel at a vehicle frontal collision.

In general, when the automotive vehicle has a frontal collision, a power train, such as an engine, (or an engine and a motor of a hybrid vehicle) provided in front of the dash panel moves rearward. Accordingly, a master vac and the dash panel are pushed rearward, resulting in the rearward move of the operational pedal. Some inventions regarding the operational pedal support structure of an automotive vehicle which can provide a so-called rearward move restraint mechanism to restrain the rearward move of the operational pedal for ensuring the safety of a passenger have been made (see the following patent documents).

A conventional structure disclosed in PCT Publication No. WO03/045750 is such that, as shown in FIG. 16, a fixed pedal support member 100 attached on the side of the dash panel is provided, a pedal axis 102 of a pedal body 101 is arranged in a L-shaped slot 103 of the fixed support member 100, and a rotational lever 105 is attached via an axis 104 in back of the pedal axis 102. Herein, the pedal axis 102 is held by a holding portion 105a of the rotational lever 105 at the normal state, while at the vehicle frontal collision the rotational lever 105 comes to hit against a vehicle-body side member 106 provided on the side of an instrument panel member and thereby rotates in the direction of an arrow h, so that a pressing portion 105b of the rotational lever 105 presses down the pedal axis 102 along the L-shaped slot 103. Accordingly, the pedal body 101 is rotated around a pivot of an axis 108 of a push rod 107, so that a pedal pad 109 is moved forward as shown by an arrow i in FIG. 16. Thus, the rearward move of the pedal can be restrained.

According to the above-described conventional structure, however, since the fixed pedal support member 100 needs a support portion to support the axis 104 because the axis 104 of the rotational lever 105 is positioned in back of the pedal axis 102, there was a problem in that the pedal support structure would not be made properly compact. Further, since the rotational lever 105 rotates, the holding of the pedal axis 102 by the holding portion 105a may be unstable. Therefore, there is a concern that the position of the pedal axis 102 would lower improperly according to some operational manner of the pedal body 101 by the passenger. Thus, there was a problem in that the reliability of the pedal support would deteriorate.

Another conventional structure disclosed in Japanese Patent Laid-Open Publication No. 2008-77150 is such that, as shown in FIG. 17, a fixed pedal support member 201 attached on the side of a dash panel 200 is provided, a pedal axis 203 of a pedal body 202 is pivotally supported at the fixed pedal support member 201, and a rotational lever 205 is attached via an axis 204 in back of the pedal axis 203. Herein, the pedal axis 203 is held by a projection 201a of the fixed pedal support member 201 and a stopper 208 at the normal state, and at the vehicle frontal collision the rotational lever 205 comes to hit against a vehicle-body side member 207 provided on the side of an instrument panel member 206 and thereby rotates in the direction of an arrow j, so that a pressing portion 205a of the rotational lever 205 presses down the pedal axis 203. Accordingly, the pedal axis 203 makes the projection 201a and the stopper 208 deform, so that the pedal axis 203 drops. Thus, the rearward move of the pedal can be restrained.

According to the above-described conventional structure, however, since the fixed pedal support member 201 needs a support portion to support the axis 204 because the axis 204 of the rotational lever 205 is positioned in back of the pedal axis 203, there was a problem in that the pedal support structure would not be made properly compact as well. Further, the stopper 208 was necessary additionally.

Another conventional structure disclosed in Japanese Patent Laid-Open Publication No. 2006-139345 is such that, as shown in FIG. 18, a bracket 302 is provided at a lower portion of a cowl panel 301, which is a vehicle-body rigidity member which may move rearward only slightly relative to a dash panel 300 at the vehicle frontal collision, and a fixed pedal support member 304 and a swing pedal support member 305 are provided at the bracket 302 via bolt and nut 303 so that they can move rearward at the vehicle collision. These members 304, 305 are formed in a gate shape, and the swing pedal support member 305 is arranged inside the fixed pedal support member 304. Further, a vehicle-body side member 306 is attached to the lower portion of the cowl panel 301, and a wire guide 307 and a plate-shaped projecting member 308 are attached to the fixed pedal support member 304 as a unit. Moreover, a pedal axis 310 is provided at the swing pedal support member 305 via a pivot of a pivot axis 309. A pedal body 311 is attached to the pedal axis 310. One end of a wire 312 is fixed to the bracket 302. A middle portion of this wire 312 is guided by a guide portion 307a of a wire guide 307, and the other end of the wire 312 is fixed around the pedal axis 310. When the automotive vehicle has the frontal collision, the dash panel 300 moves rearward and thereby the fixed pedal support member 304 and the swing pedal support member 305 are detached from the bracket 302 as shown by an arrow k in FIG. 18. Then, the wire 312 tenses, and the other end of this wire 312 pulls back the pedal axis 310. Accordingly, the pedal axis 310 and the swing pedal support member 305 rotate clockwise around the pivot of the pivotal axis 309. Thereby, the pedal body 311 rotates around an axis 314 of a push rod 313 so that a pedal pad 315 moves forward (in the direction of an arrow m). Thus, the rearward move of the pedal can be restrained.

According to the above-described conventional structure, however, since the mechanism to compulsively move the pedal body 311 obliquely forward and downward by pulling out the swing pedal support member 305 at the vehicle frontal collision exists in back of the pedal axis 310, there was a problem in that the pedal support structure would not be made properly compact.

Further another conventional structure disclosed in US Patent Application Publication No. 2006/0162481 is such that, as shown in FIG. 19, a fixed pedal support member 401 attached to a dash panel 400 is provided, a pedal axis 403 of a pedal body 402 is pivotally supported at a lower portion of the fixed pedal support member 401, and a rotational lever 405 is attached to an upper portion of the fixed pedal support member 401 via an axis 404. Further, a vehicle-body side member 407 is attached to an instrument panel member 406, and a T-shaped link 408 and a straight-shaped link 409 are arranged between the rotational lever 405 and the pedal body 402. According to this structure shown in FIG. 19, at the vehicle frontal collision the rotational lever 405 comes to hit against a vehicle-body side member 407 and thereby rotates in the direction of an arrow n, so that a lower portion of the rotational lever 405 pushes a rear portion of the T-shaped link 408 and thereby rotates this link 408 downward as shown by an arrow p. The T-shaped link 408 pushes down the straight-shaped link 409 as shown by an arrow r. Thereby, an upper rear portion of the pedal body 402 is pressed downward, so that the pedal pad 402 is rotated so that a pedal pad 410 can move forward as shown by an arrow s. Thus, the rearward move of the pedal can be restrained.

According to the above-described conventional structure, since the axis 404 of the rotational lever 405 exits in front of the pedal axis 403, the rearward move of the rotational lever 405 may be ensured, but its downward move may not be ensured. Therefore, the two links 408, 409 are used in this conventional structure for ensuring the downward move. Herein, this conventional structure had a problem in that since the mechanism to compulsively move the pedal body 402 exists in back of the pedal axis 403, the pedal support structure would not be made properly compact. Further, since at the vehicle collision the position of the pedal axis 403 may be constant and the pedal may not drop despite the forward move of the pedal pad 410, there was another problem in that any lower space would not be utilized effectively. Moreover, since any proper movement may not be obtained in case the links 408, 409 do not move smoothly due to the vehicle frontal collision, there was further another problem in that the reliability would deteriorate, the number of parts would increase, and the structure would become improperly complex.

In FIGS. 16-19, an arrow F shows the forward direction of the vehicle.

SUMMARY OF THE INVENTION

An object of the present invention is to provide an operational pedal support structure of an automotive vehicle equipped with a means for compulsively moving down the pedal at the vehicle frontal collision, which can be made properly compact and simple having a high reliability.

According to the present invention, there is provided an operational pedal support structure of an automotive vehicle, which is arranged in back of a dash panel constituting a front portion of a vehicle compartment, comprising a fixed pedal support member provided on the side of the dash panel, a swing pedal support member supported relative to the dash panel so as to swing in a vertical direction around a front portion thereof and extending obliquely upward and rearward, a first pivotal axis provided at a rear portion of the swing pedal support member and extending in a vehicle width direction, a pedal body supported at the swing pedal support member via the first pivotal axis so as to swing around the first pivotal axis, a vehicle-body side member provided in back of and away from the fixed pedal support member and fixed to a vehicle body, a rotational lever provided in front of and away from the vehicle-body side member, the rotational lever being supported at the fixed pedal support member via a second pivotal axis extending in the vehicle width direction so as to swing in a vehicle longitudinal direction around the second pivotal axis, the rotational lever contacting the vehicle-body side member and rotating around the second pivotal axis so as to press down the swing pedal support member downward in case the fixed pedal support member moves rearward, a downward-move restricting means to allow a downward move of the first pivotal axis only in case the rotational lever rotates, and a pressing portion provided at the rotational lever so as to press down the swing pedal support member, the pressing portion being positioned in front of the second pivotal axis.

According to the present invention, since the rotational lever hits against the vehicle-body side member and thereby rotates around the second pivotal axis at the vehicle frontal collision, so that the pressing portion of the rotational lever presses down the swing pedal support member and thereby the downward move of the first pivotal axis (pedal axis) is allowed, the pedal body can be compulsively moved downward and thereby the safety of the passenger can be ensured. Thus, since the pressing portion of the rotational lever presses down the swing pedal support member in front of the second pivotal axis, the operational pedal support structure equipped with the means for compulsively moving down the pedal at the vehicle frontal collision can be made properly compact. Further, since the downward move of the pedal axis as the first pivotal axis is allowed only in case the rotational lever rotates, the simple operational pedal support structure of an automotive vehicle having the high reliability can be provided. Moreover, since the rotational lever is arranged in front of and away from the vehicle-body side member, assembling of an instrument panel module to a vehicle body after the pedal is attached can be improved. In addition, since in case the pressing portion of the rotational lever presses down the swing pedal support member and thereby the first pivotal axis is moved downward, the rear portion of the swing pedal support member rotates in an arc shape around its front portion and the middle portion of the pedal body is pivotally connected to the rear end of the push rod, the pedal axis as the first pivotal axis is moved downward and the pedal pad (pedal pressing face) moves obliquely forward and downward at the vehicle collision. Consequently, the sufficient amount of rearward-move prevention can be ensured.

According to an embodiment of the present invention, the swing pedal support member has a receiving portion which is slant or curves in the vehicle width direction so as to contact the pressing portion. Thereby, the contact of the pressing portion of the rotational lever and the receiving portion of the swing pedal support member can be obtained surely, so that the compulsive downward move of the first pivotal axis and the pedal body at the vehicle collision can be obtained surely.

According to another embodiment of the present invention, the downward-move restricting means comprises a holding portion which is provided at the rotational lever so as to hold the swing pedal support member in case the rotational lever does not rotate so that the swing pedal support member cannot swing downward, and to release the holding of the swing pedal support member in case the rotational lever rotates so that the downward move of the first pivotal axis can be allowed. Thereby, the swing pedal support member can be surely held by the holding portion at the normal state (the vehicle non-collision). Further, since this holding is released at the vehicle collision, the downward move of the first pivotal axis can be allowed, so that any erroneous operation may be prevented.

According to another embodiment of the present invention, the downward-move restricting means comprises an opening which opens from a first-pivotal-axis support portion to support the first pivotal axis in a different direction from a direction of an operational load which is applied to the first pivotal axis in case the pedal body is operated, and a restricting portion which is formed between the opening and the first-pivotal-axis support portion and deforms so as to allow the first pivotal axis to pass therethrough in case the downward load acting is the specified magnitude or greater. Thereby, since the restriction portion restricts the downward move of the pedal axis as the first pivotal axis in case the downward load acting is smaller than the specified magnitude, the erroneous operation of the pedal dropping at the normal state (the vehicle non-collision) can be prevented surely. Meanwhile, at the vehicle frontal collision the restricting portion deforms, by receiving the downward load acting which is the specified magnitude or greater, and allows the first pivotal axis to pass through the first pivotal axis. Thus, the pedal is moved downward compulsively, so that the rearward move of the pedal can be prevented surely. Herein, the opening may comprise a slit portion which extends from the first-pivotal-axis support portion more downward than the direction of the operational load which is applied to the first pivotal axis in case the pedal body is operated.

According to another embodiment of the present invention, the second pivotal axis is positioned above the first pivotal axis and at the same location as the first pivotal axis in the vehicle longitudinal direction or in front of the first pivotal axis. Thereby, the longitudinal dimension of the pedal support structure (especially, the fixed pedal support member) can be properly shortened.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
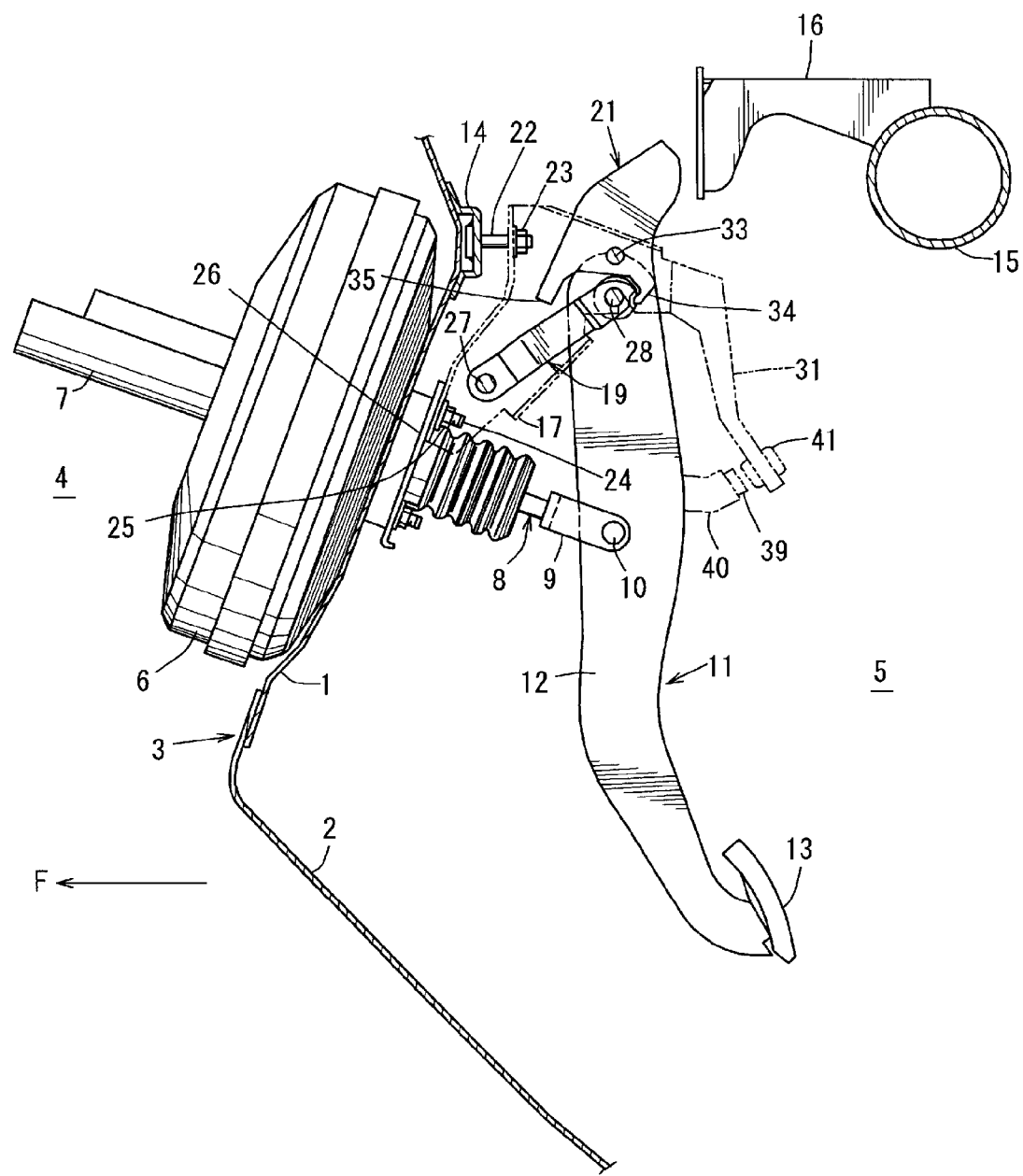
FIG. 1 is a side view showing an operational pedal support structure of an automotive vehicle according to a first embodiment of the present invention.
Figure 2:
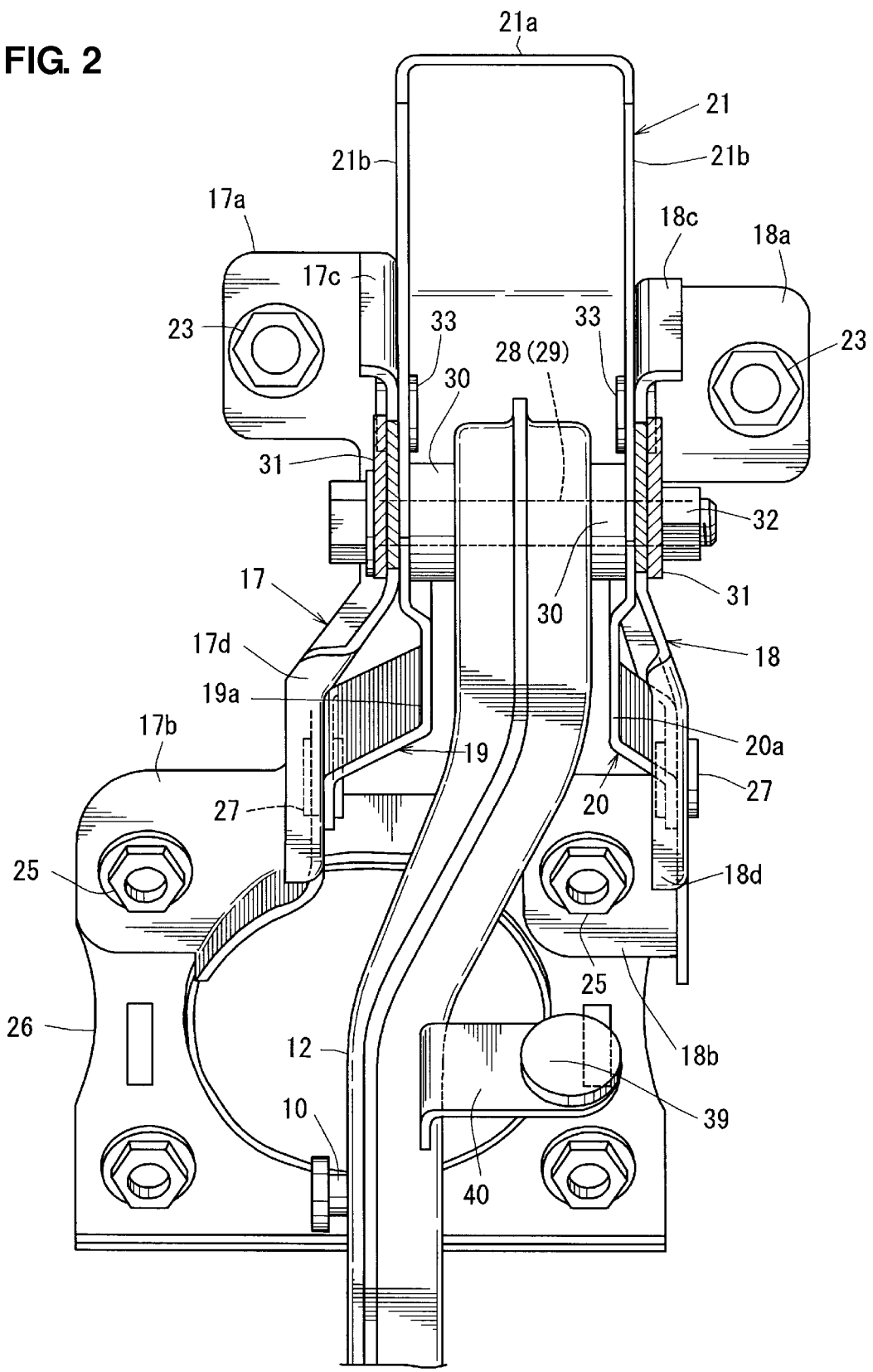
FIG. 2 is a back view of the operational pedal support structure of FIG. 1, when viewed from the inside of a vehicle.
Figure 3:
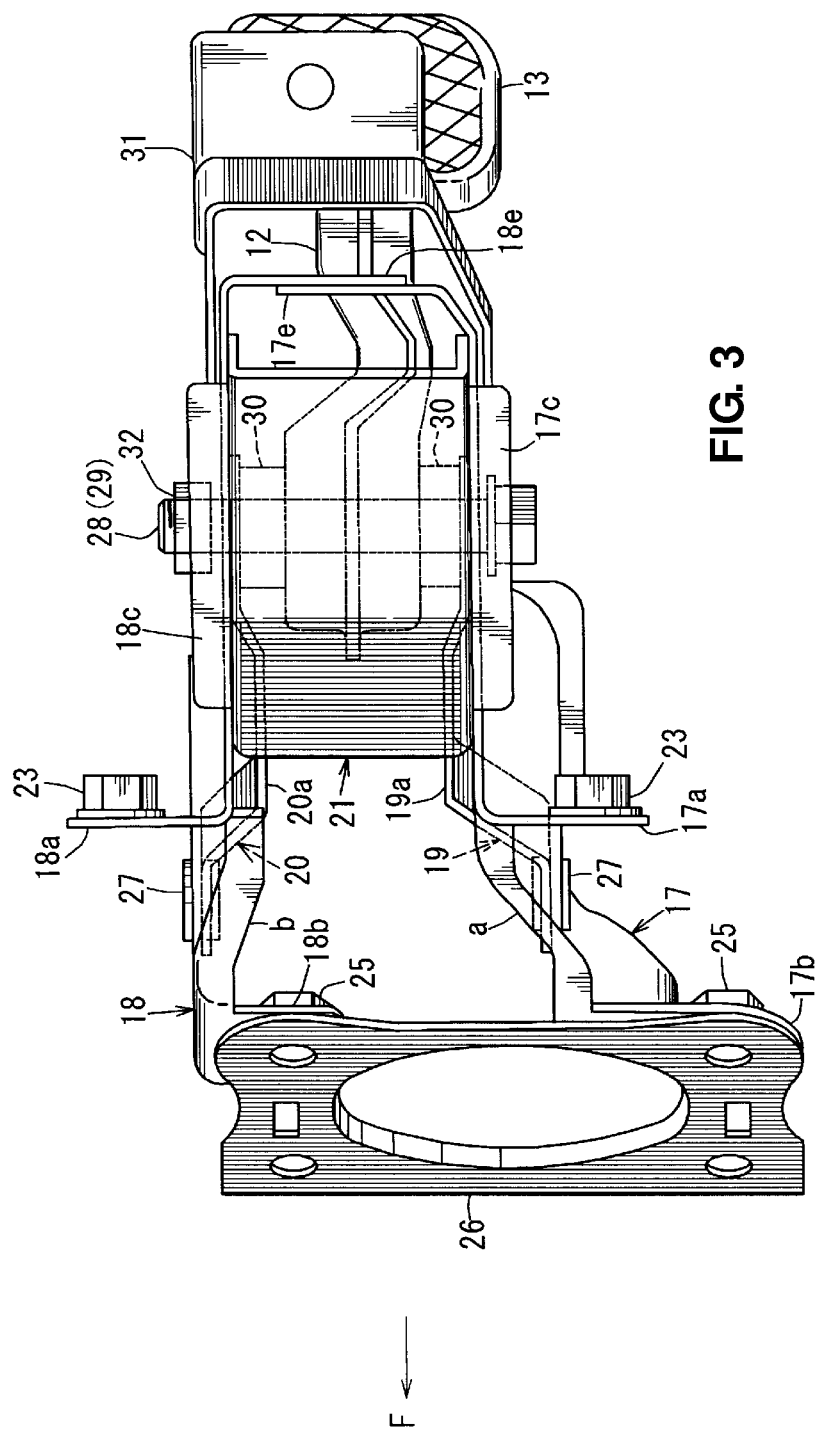
FIG. 3 is a plan view of a major part of FIG. 1.

FIG. 1 is a side view showing an operational pedal support structure of an automotive vehicle according to a first embodiment, FIG. 2 is a back view of the operational pedal support structure of FIG. 1, and FIG. 3 is a plan view of a major part of FIG. 1. In FIG. 1, a dash panel 3 is formed by a dash upper panel 1 (an upper dash-panel) and a dash lower panel 2 (a lower dash-panel) which are joined, which partitions an engine room 4 (a two-kind motor room of a hybrid vehicle) from a vehicle compartment 5 in a vehicle longitudinal direction. Herein, the dash panel 3 is a panel member which constitutes a front portion of the vehicle compartment 5. A master vac 6 and a master cylinder 7 of a brake device are arranged at the dash upper panel 1 on the side of the engine room 4.

A push rod 8 of the brake device extends toward the vehicle compartment 5, and its rear end is connected to a middle portion of a pedal body 12 of a brake pedal 11 as an operational pedal via a fork 9 and an axis 10. A pedal pad 13 as a pedal pressing face is formed at a lower end portion of the pedal body 12.

An operational pedal support structure of an automotive vehicle is arranged in back of the dash panel 3 which constitutes the front portion of the vehicle compartment 5, that is, on the side of the vehicle compartment 5. On the side of the vehicle compartment 5 from the dash upper panel 1, a dash cross member 14 which extends in a vehicle width direction is attached to a specified portion which corresponds to an upper portion of the master vac 6. Further, an instrument panel member 15 which extends in the vehicle width direction and has a closed cross section is provided at a specified portion in the vehicle compartment which corresponds right and left hinge pillars (not illustrated). Moreover, a vehicle-body side member 16 which functions as a bracket for contact is attached to a front portion of the instrument panel member 15.

As shown in the back view of FIG. 2, the plan view of FIG. 3, and the exploded perspective view of FIG. 4, the operational pedal support structure of an automotive vehicle according to the present embodiment comprises a pair of fixed pedal support members 17, 18 (hereinafter, referred to as "mount brackets"), a pair of swing pedal support members 19, 20 (hereinafter, referred to as "swing arms"), the above-described pedal body 11, the above-described vehicle-body side member 16, and a rotational lever 21 which is formed in a gate shape. The pedal body 11 is supported at the pair of swing arms 19, 20 via a first pivotal axis 28 (pedal axis) which will be described below.

Figure 4:
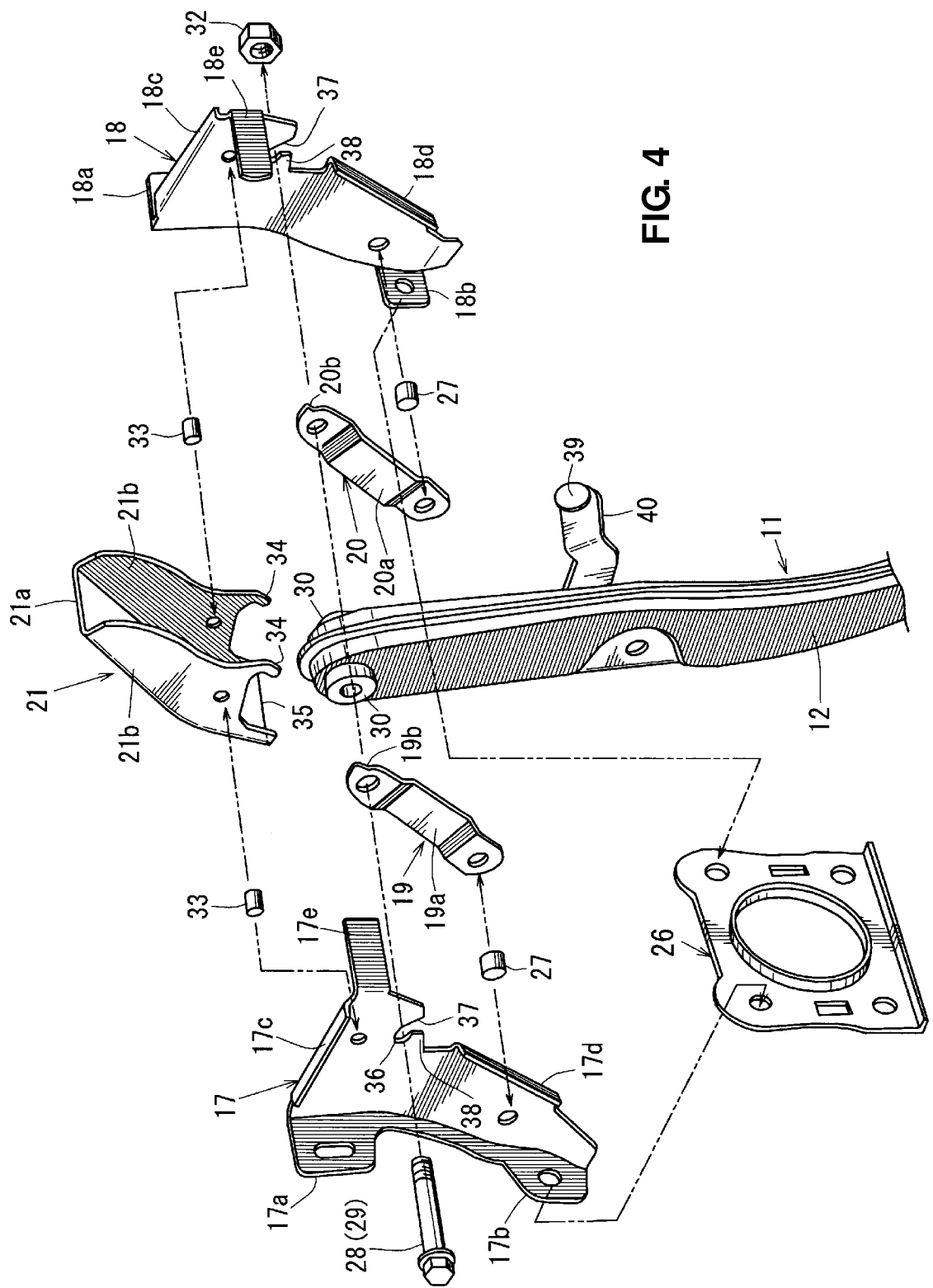
FIG. 4 is an exploded perspective view of the operational pedal support structure.

As shown in the exploded perspective view of FIG. 4, the left-side mount bracket 17 includes an upper attachment piece 17a and a lower attachment piece 17b, which are bent integrally, at its front portion. It includes flanges 17c, 17d which face to the left at its upper and lower portions. It further includes a bend piece 17e which faces to the right at its rear portion. The right-side mount bracket 18 includes an upper attachment piece 18a and a lower attachment piece 18b, which are bent integrally, at its front portion. It includes a flange 18c which faces to the right at its upper, and includes a flange 18d which faces to the left at its lower portion. It further includes a bend piece 18e which faces to the left at its rear portion.

As shown in FIGS. 1 and 2, the upper attachment pieces 17a, 18a of the mount brackets 17, 18 are attached to the dash cross member 14 with attaching members such as bolts 22 and nuts 23. The lower attachment pieces 17b, 18b of the mount brackets 17, 18 are attached to the bracket 26 (attaching bracket) with attaching members such as bolts 24 and nuts 25 as shown in FIGS. 1 through 3. This bracket 26 is an attaching bracket which is provided at the dash panel 3 (specifically, the dash upper panel 1) on the side of the vehicle compartment 5 so as to correspond to the center of the master vac 6.

Thus, the right and left mount brackets 17, 18 attached on the side of the dash panel 3 have portions a, b so that each of their rear sides is relatively narrow and each of their front sides is relatively wide as shown in the plan view of FIG. 3. Thereby, the rigidity of these brackets 17, 18 and the safety of the pedal support are ensured.

The above-described swing arms 19, 20 are supported so as to swing vertically relative to the dash panel 3 at their front portions and extend obliquely rearward and upward as shown in FIG. 1. In the present embodiment, as shown in FIGS. 2 and 3, the right and left swing arms 19, 20 are pivotally supported at the mount brackets 17, 18 independently via pins 27, 27 (axes extending in the vehicle width direction).

Further, the swing arms 19, 20 include receiving portions 19a, 20a at their middle portions, respectively. These portions 19a, 20a are formed in a convex shape by bending their middle portions toward the pedal body 12 so as to be contacted by the rotational lever 21. Thereby, the appropriate rigidity of the swing arms 19, 20 can be ensured. Further, the amount of contact face overlapping between the rotational lever 21 and the swing arms 19, 20 can be properly enlarged in case the rotational lever 21 rotates, so that the rotational lever 21 can contact the swing arms 19, 20 surely. The pedal body 12 is pivotally supported at rear portions (free end portions) of the swing arms 19, 20 via the pedal axis 28 as the first pivotal axis which extends in the vehicle width direction.

In the present embodiment, while a bolt 29 having a specified length is used as the pedal axis 28, as shown in the back view of FIG. 2, spacers 30, 30 are arranged at both sides of the pedal body 12, the swing arms 19, 20 are arranged on the outside of the spacers 20, the mount brackets 17, 18 are arranged on the outside of the swing arms 19, 20, and pedal stoppers 31, 31 are arranged on the outside of the mount brackets 17, 18. Herein, in these state, a nut 32 is fastened at an end of the bolt 29 which has been inserted. Thus, the pedal body 12 is supported between the right and left swing arms 19, 20 so as to swing. Herein, the above-described pedal stoppers may be joined to the mount brackets, and in this case the stoppers may be joined at a position away from the bolts. The above-described vehicle-body side member 16 as the reinforcing member on the side of instrument panel member 15 is fixed in back of and away from the mount brackets 17, 18. More specifically, the vehicle-body side member 16 is fixed in back of and away from the rear portion of the rotational lever 21 as well.

The rotational lever 21 is not connected to, preferably away from the front portion of the vehicle-body side member 16 as shown in FIGS. 1 and 2, and supported at the mount brackets 17, 18 via rotational lever axes 33, 33 as the second axis which extends in the vehicle width direction so as to swing in the vehicle longitudinal direction. In case the mount brackets 17, 18 having the gate shape move rearward and then hit against the vehicle-body side member 16, the rotational lever 21 rotates around the rotational lever axes 33, 33 and then presses down the swing arms 19, 20.

Figure 5:
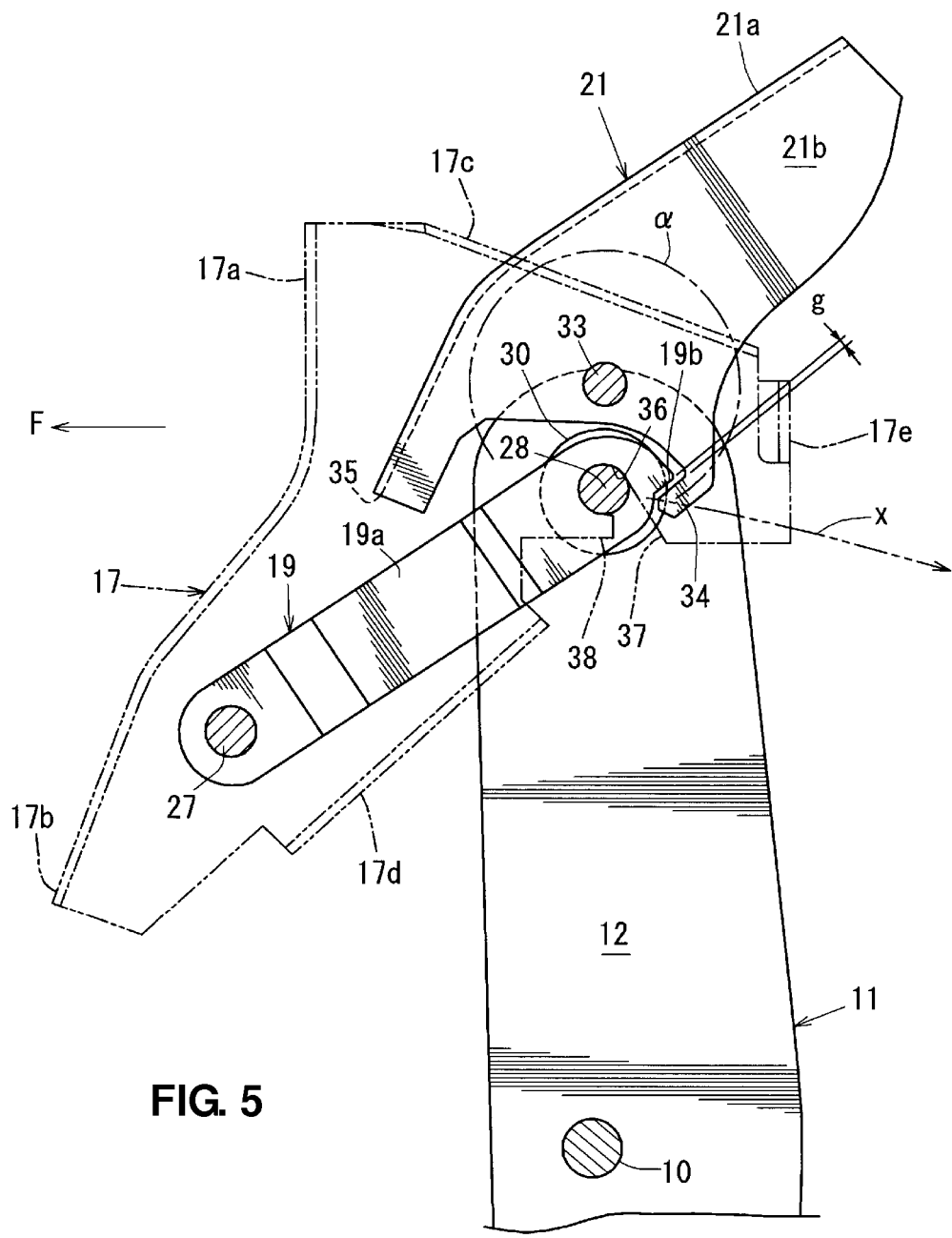
FIG. 5 is an enlarged side view of a major part of FIG. 1.

FIG. 5 is an enlarged side view of a major part of FIG. 1, and as shown in this figure, the rotational lever axes 33, 33 are positioned substantially right above the pedal axis 28.

As shown in FIGS. 4 and 5, the rotational lever 21 includes an upper piece 21a and flanges 21b, 21b which are formed integrally so as to be bent from both sides of the upper piece 21a. The right and left flanges 21b, 21b have holding portions 34, 34 at their lower portions. The support portions 34, 34 hold the swing arms 19, 20 in case the rotational lever 21 does not rotate (at the vehicle non-collision), and release this holding of the swing arms 19, 20 in case the rotational lever 21 rotates.

Herein, each of the holding portions 34 is, as shown in the enlarged view of FIG. 5, formed so as to extend straightly along or obliquely inward relative to its rotational locus α. Thereby, the appropriate engagement between the holding portions 34 and the swing arms 19, 20 at the normal state (the vehicle non-collision) is ensured. As shown in FIG. 5, the holding portion 34 is provided at the same longitudinal position as the rotational lever axis 33 which is as the second pivotal axis of the rotational lever 21 or in back of the rotational lever axis 33 (the present embodiment) so as to hold the swing arms 19, 20 in case the rotational lever 21 does not rotate and not to hold the swing arms 19, 20, i.e., to release the holding of the swing arms 19, 20 in case the rotational lever 21 rotates (see FIGS. 7 through 10).

Further, the lower portion of the upper piece 21a of the rotational lever 21 functions as a pressing portion 35. The pressing portion 35 presses down the receiving portions 19a, 20a of the swing arms 19, 20 so that the swing arms 19, 20 can be moved downward in case the rotational lever 21 rotates. As shown in FIG. 5, the pressing portion 35 is positioned in front of and below the rotational lever axis 33.

Meanwhile, as shown in FIGS. 4 and 5, a downward-move restricting means (see the above-described holding portions 34 and/or slit portions 37 and restricting portions 38, which will be described below) to restrict the downward move of the pedal axis 28 as the first pivotal axis is provided at the mount brackets 17, 18 and/or the rotational lever 21. This downward-move restricting means comprises the slit portions 37 which extend downward from the first-pivotal-axis support portions 36 to support the pedal axis 28 in a different direction from the direction of an operational load which is applied to the pedal axis 28 in case the pedal body 12 is operated, and the restricting portions 38 which are formed between the slit portions 37 and the first-pivotal-axis support portions 36 and deform so as to allow the pedal axis 28 to pass therethrough in case a downward load acting on the pedal axis 28 is the specified magnitude or greater. Herein, the above-described direction of the operational load almost matches the locus of an arc shape with its center at the axis 10 in case the pedal is pressed the most.

Thus, the mount brackets 17, 18 are configured to restrict the downward move of the pedal axis 28 for the input load smaller than the specified magnitude, and allow the downward move of the pedal axis 28 for the input load of the specified magnitude or greater. Herein, it is preferable that the restricting portions 38 have a shape extending toward the holding portion 34. That is, the downward-move restricting means which comprises the above-described holding portions 34 and/or the slit portions 37 and the restricting portions 38 is the means for allowing the pedal axis 28 as the first pivotal axis to be compulsively moved downward only in case the rotational lever 21 rotates.

Meanwhile, as shown in FIGS. 4 and 5, engaging convex portions 19b, 20b are formed at rear portions (free end lower portions) of the swing arms 19, 20 so as to face to holding portions 34, 34.

Between the engaging convex portions 19b, 20b and the holding portions 34, 34 are formed a gap g at the normal state as shown in FIG. 5. This gap g functions to prevent any noise from occurring during the vehicle traveling.

At the normal state, the pedal axis 28 is supported at the first-pivotal-axis support portions 36 and the restricting portions 38 of the mount brackets 17, 18. In case of a so-called panic braking in which the driver conducts a panic operation of the brake pedal 11 at the vehicle frontal collision, the relatively large force acts on the pedal axis 28 compared to the normal braking operation, so that the above-described gap g vanishes. Therefore, the pedal axis 28 is held by both of the restricting portions 38 and the holding portions 34 at the panic braking.

Herein, as shown in FIGS. 2, 3 and 5, the engaging convex portions 19b, 20b and the holding portions 34 are arranged between the spacers 30 and the mount brackets 17, 18 and thereby positioned properly. Further, as shown in FIG. 5, the upper portion of the pedal body 12 and the rotational lever 21 are configured to overlap with each other in the vehicle vertical direction, so that the vertical dimension of the operational pedal support structure is made properly compact.

As shown in FIG. 5, the pedal axis 28 and the rotational lever axes 33 are arranged closely and the rigidity of the portion at the rotational lever axes 33 is increased by the spacers 30, so that the relative position of the rotational lever axes 33 to the pedal axis 28 changes so little that the stable move of the rotational lever 21 can be ensured. Additionally, the swing arms 19, 20 and the rotational lever 21 are supported at the mount brackets 17, 18 respectively and separately. Thereby, the concave space between the swing arms 19, 20 and below the rotational lever 21 can be utilized, and the stable move (rotational operation) can be obtained at the vehicle frontal collision even if these elements 19, 20, 21 are distorted.

Further, the mount brackets 17, 18 and the swing arms 19, 20 are respectively made of a plate member, and as shown in FIGS. 2 and 3, these members 17-20 are formed in the curve shape described above, respectively. Accordingly, both the increase of rigidity of these members 17-20 and the light weight are achieved.

The rotational lever 21 in the non-rotation state is away from the swing arms 19, 20 as well as from the vehicle-body side member 16 as shown in FIG. 5. Thereby, both the improvement of assembling and the prevention of noise occurring are achieved. Moreover, the rotational lever 21 is formed in the gate shape, the swing arm are comprised of the pair of swing arms 19, 20 which are formed so as to project inward, and the rotational member 21 and the swing arms 19, 20 are formed in the shape along side walls of the mount brackets 17, 18. Thereby, both the stability of the brake pedal 11 moving downward and the properly pressing down of the swing arms 19, 20 by the rotational lever 21 are achieved.

The pressing portion 35 of the rotational lever 21 projects downward and forward from the rotational lever axes 33 as the second pivotal axis. Thereby, the pressing portion 35 is pushed rearward by the dash panel 3 at the vehicle collision, so that the rotation of the rotational lever 21 is promoted. Herein, the flanges 21b, 21b of the rotational levers 21 and the swing arms 19, 20 may be arranged between the mount brackets 17, 18 and the spacers 30, 30 so that the holding portions 34 can hold the engaging convex portions 19b, 29b of the swing arms 19, 20 more surely at the panic braking. Thereby, the thick of the swing arms 19, 20 can be made thinner, and the move of the rotational lever 21 at the normal state can be made difficult by the fastening structure with the bolt 29 and nut 32. Herein, the flanges 21b, 21b of the rotational levers 21 may not be arranged between the mount brackets 17, 18 and the spacers 30, 30 in order to give priority to the fastening safety with the bolt 29 and nut 32.

In the figures, reference numeral 39 denotes a foot-brake lamp switch contract portion which provided at the pedal body 12 via a bracket 40, reference numeral 41 denotes a foot-brake lamp switch which is attached to a lower portion of the pedal stopper 31, and an arrow F denotes the forward direction of the vehicle.

Figure 6:
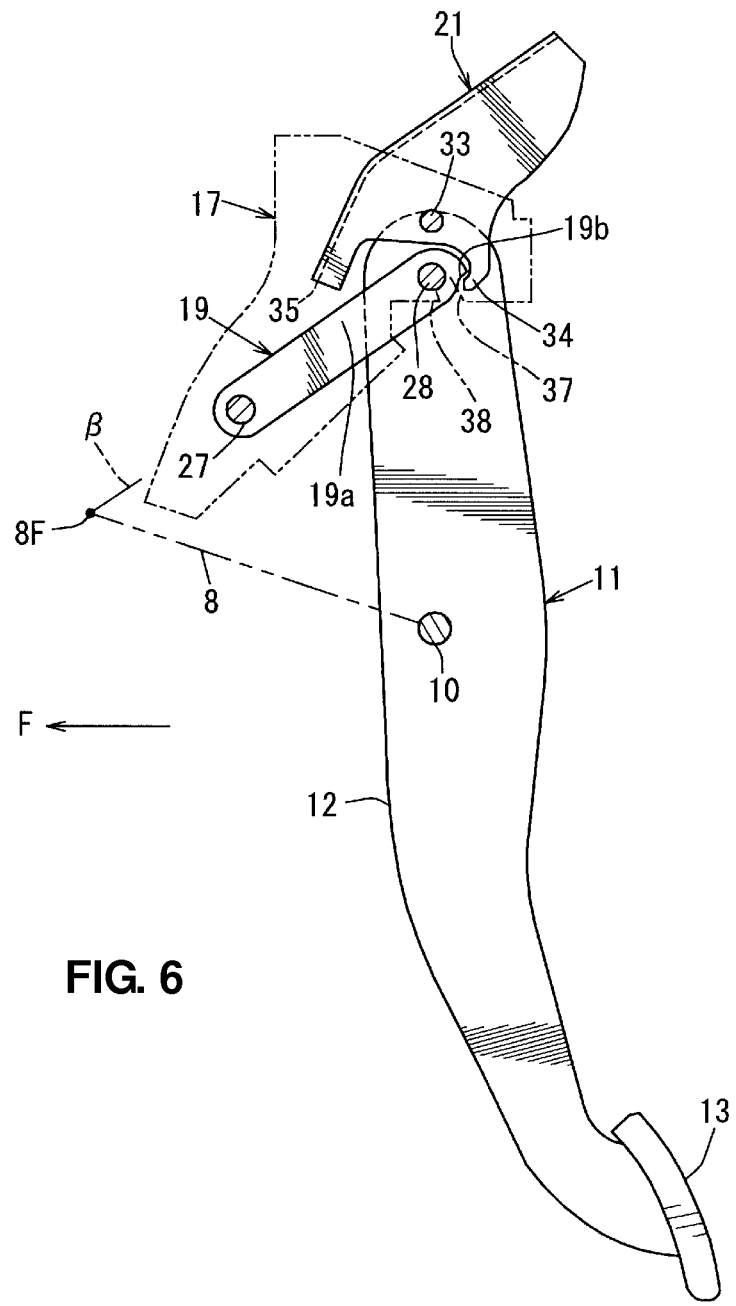
FIG. 6 is a side view of the operational pedal support structure at a vehicle non-collision.

Hereinafter, the operation of the operational pedal support structure of an automotive vehicle will be described referring to FIGS. 6 through 10. FIG. 6 is a side view of the operational pedal support structure at the normal state (vehicle non-collision). In this figure, an extension line β of a longitudinal direction of the swing arm 19 is set so as to pass near a front end 8F of the push rod 8, so that the downward move of the push rod 8 at the vehicle collision can be promoted.

In case the automotive vehicle in the state shown in FIG. 6 has the frontal collision, the power train in the engine room 4 retreats and then the dash panel 3 moves rearward, and eventually the rotational lever 21 hits against the vehicle-body side member 16 (see FIG. 5). Accordingly, the rotational lever 21 rotates counterclockwise around the rotational lever axis 33, and the holding portion 34 of the rotational lever 21 retreats to its non-engaging position with the swing arm 19. On the other hand, the pressing portion 35 of the rotational lever 21 contacts the receiving portions 19a, 20a of the swing arms 19, 20. In this case, since the flanges 21b, 21b of the rotational lever 21 come down into the space between the side walls of the mount brackets 17, 18 and the convex receiving portions 19a, 20a of the swing arms 19, 20, the subsequent move of the rotational lever 21 can be sure.

Figure 7:
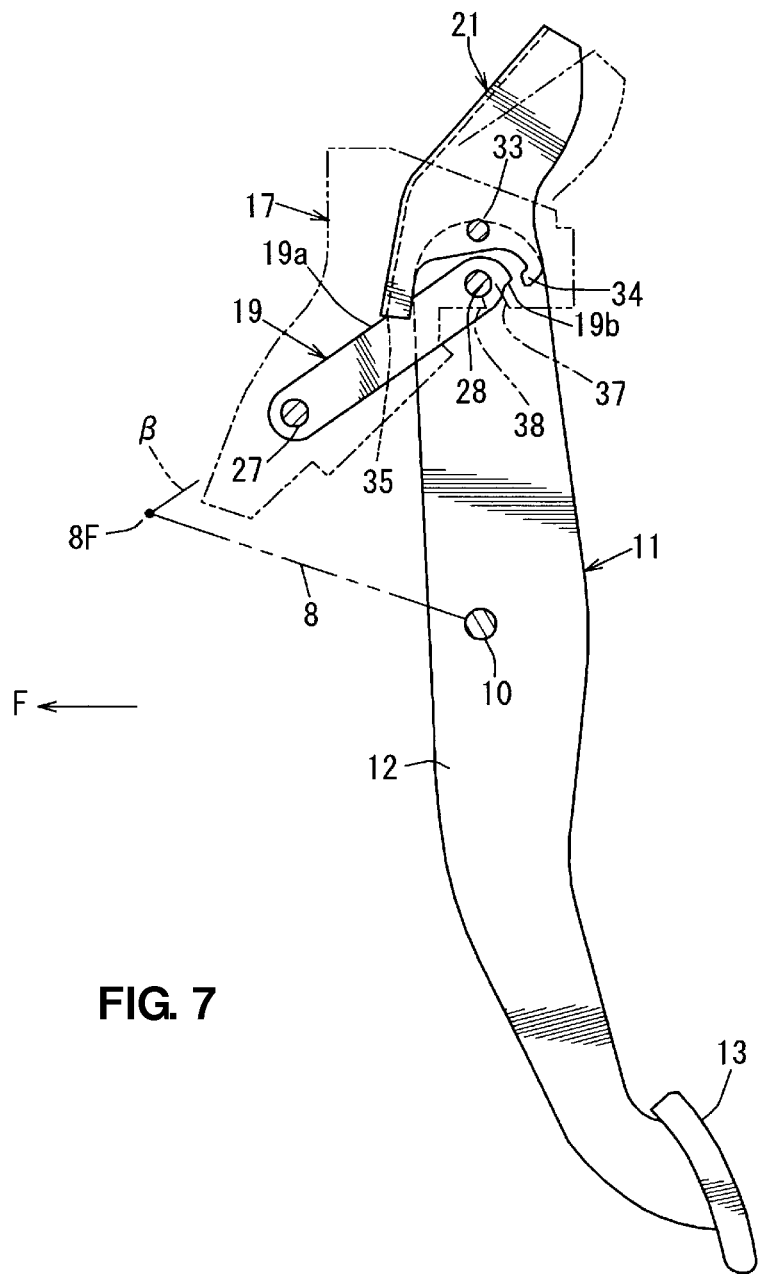
FIG. 7 is a side view showing a case in which a holding portion retreats.

In the initial stage of the rotation of the lever 21 shown in FIG. 7, the pedal axis 28 as the first pivotal axis is supported at the restricting portion 38, thereby enabling the operation of the brake pedal 11. Meanwhile, since the extension line β of the longitudinal direction of the swing arm 19 passes near the front end 8F of the push rod 8, a downward rotational moment is applied to the push rod 8 around the front end 8F.

Figure 8:
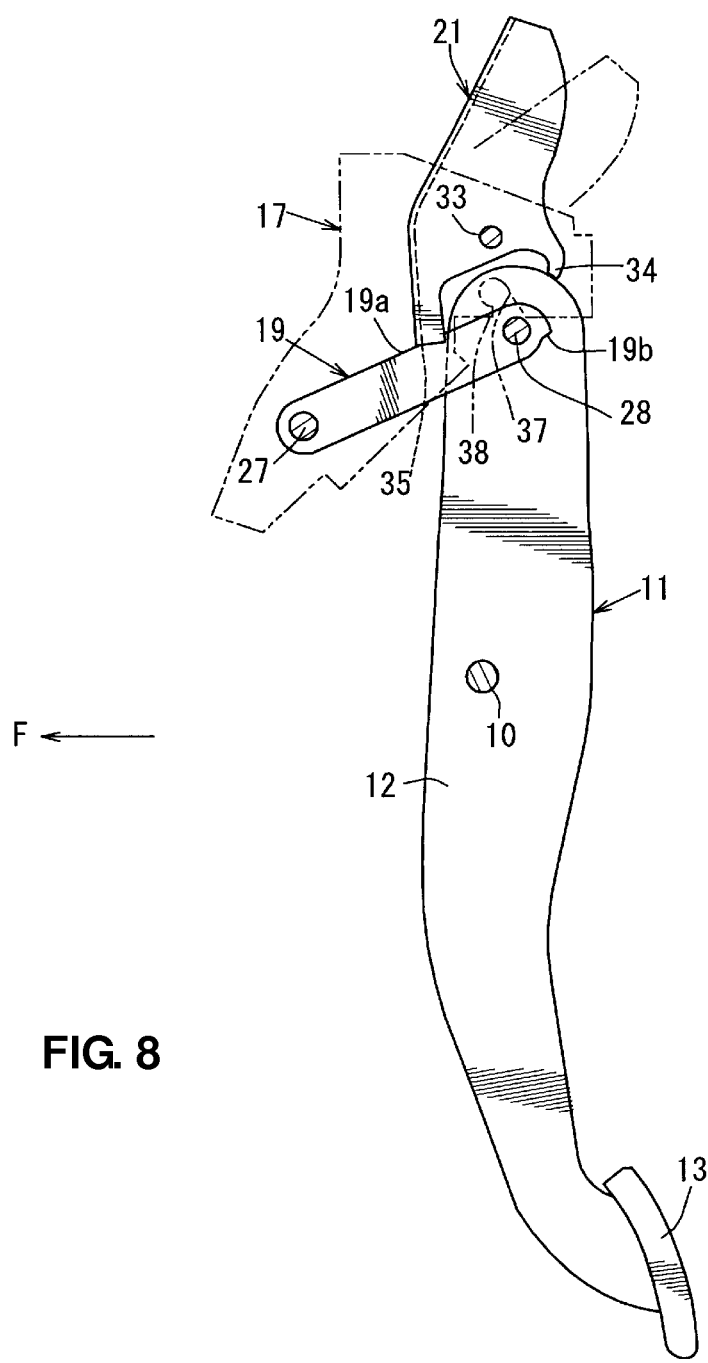
FIG. 8 is a side view showing a case in which a first pivotal axis is released.

In the middle stage of the ration of the lever 21 shown in FIG. 8 which is subsequent from the initial stage shown in FIG. 7, the swing arms 19, 20 are moved down by the pressing portion 35 of the rotational lever 21, so that the restricting portion 38 is made to break or deform by the pedal axis 28 and allows the pedal axis 28 to pass through it. Consequently, the pedal axis 28 can be moved downward.

Figure 9:
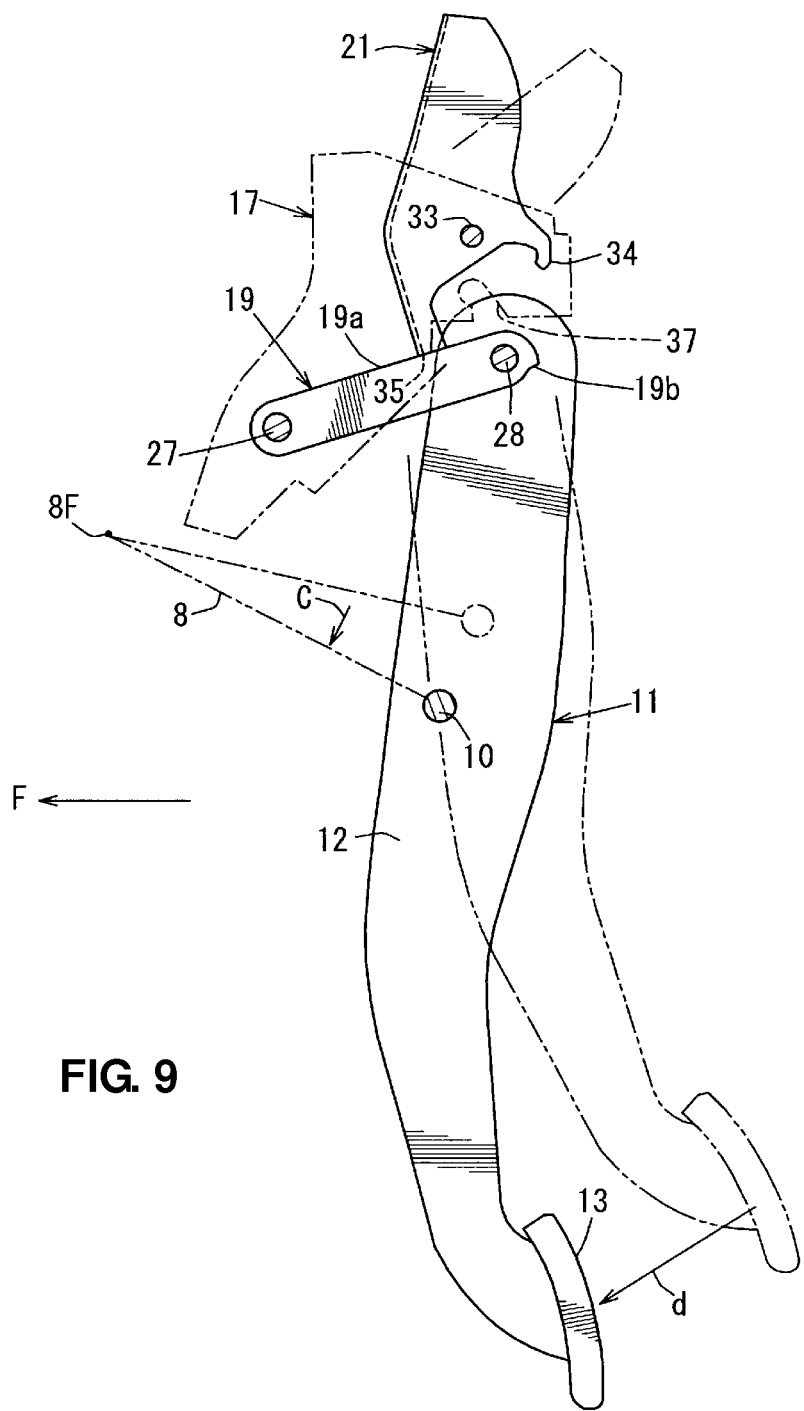
FIG. 9 is a side view showing a case of a pedal compulsive downward-move caused by a rotational lever.

In the late stage of the ration of the lever 21 shown in FIG. 9 which is subsequent from the middle stage shown in FIG. 8, the swing arms 19, 20 are moved down further by the pressing portion 35 of the rotational lever 21, and the pedal axis 28 is moved downward and rearward further. The axis 10 of the push rod 8 moves forward and downward as shown by an arrow c in FIG. 9, and the pedal pad 13 of the brake pedal 11 moves forward and downward as shown by an arrow d in FIG. 9.

Figure 10:
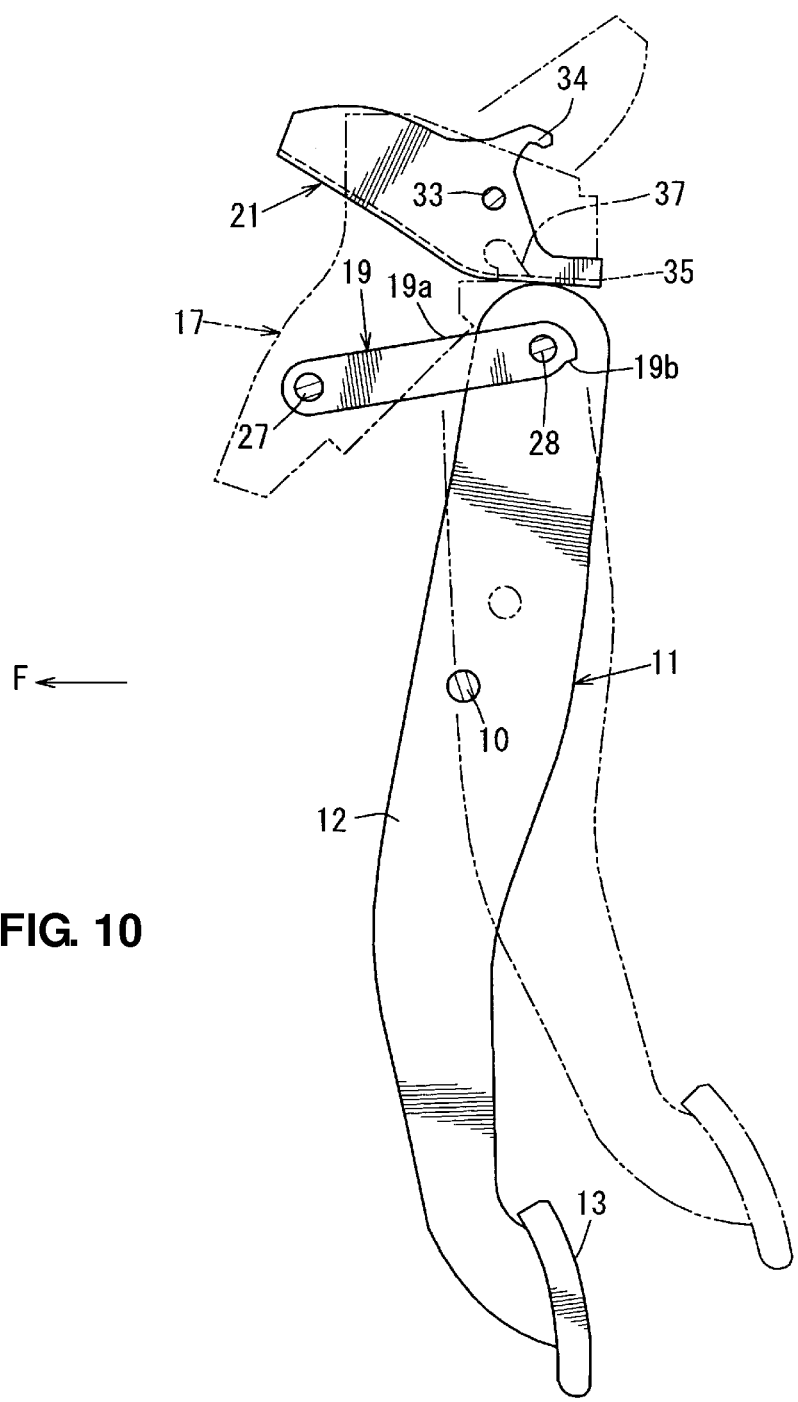
FIG. 10 is a side view showing a case in which a pressing portion of the rotational lever presses down an upper end portion of a pedal body.

In the terminal stage of the ration of the lever 21 shown in FIG. 10 which is subsequent from the late stage shown in FIG. 9, the pressing portion 35 of the rotational lever 21 pushes down the upper end portion of the pedal body 12. Thereby, the pedal pad 13 of the brake pedal 11 moves forward and downward, so that the lower space can be utilized. Thus, since the brake pedal 11 is moved forward and downward compulsively at the vehicle frontal collision, the rearward move of the brake pedal 11 can be prevented surely.

Herein, the upper end portion of the pedal body 12 overlaps with the rotational lever 21 in the vertical direction so that the upper end portion of the pedal body 12 can be pressed down by the pressing portion 35 of the rotational lever 21 in the terminal stage of the rotation of the rotational lever 21, and projects upward above the rear end of the swing arms 19, 20, both making the swing arms 19, 20 light and compact and ensuring the pedal downward stroke can be achieved.

As described above, the operational pedal support structure of an automotive vehicle according to the first embodiment shown in FIGS. 1-10, which is arranged in back of the dash panel 3 constituting the front portion of the vehicle compartment 5, comprises the fixed pedal support member (see the mount brackets 17, 18) provided on the side of the dash panel 3, the swing pedal support member (see the swing arms 19, 20) supported relative to the dash panel 3 so as to swing in the vertical direction around it front portion and extending obliquely upward and rearward, the first pivotal axis (see the pedal axis 28) provided at the rear portions of the swing pedal support member (swing arms 19, 20) and extending in the vehicle width direction, the pedal body 12 supported at the swing pedal support member (see the swing arms 19, 20) via the first pivotal axis (pedal axis 28) so as to swing around the first pivotal axis (pedal axis 28), the vehicle-body side member 16 provided in back of and away from the fixed pedal support member (mount brackets 17, 18) and fixed to the vehicle body, the rotational lever 21 provided in front of and away from the vehicle-body side member 16, the rotational lever 21 being supported at the fixed pedal support member (mount brackets 17, 18) via the second pivotal axis (see the rotational lever axes 33) extending in the vehicle width direction so as to swing in the vehicle longitudinal direction around the second pivotal axis (rotational lever axes 33), the rotational lever 21 contacting the vehicle-body side member 16 and rotating around the second pivotal axis (rotational lever axes 33) so as to press down the swing pedal support member (swing arms 19, 20) downward in case the fixed pedal support member (mount brackets 17, 18) moves rearward, the downward-move restricting means (see the holding portion 34 and/or the slit portion 37 and the restricting portion 38) to allow the downward move of the first pivotal axis (pedal axis 28) only in case the rotational lever 21 rotates, and the pressing portion 35 provided at the rotational lever 21 so as to press down the swing pedal support member (swing arms 19, 20), the pressing portion 35 being positioned in front of the second pivotal axis (rotational lever axis 33) (see FIGS. 1 and 4).

According to the above-described structure, since the rotational lever 21 hits against the vehicle-body side member 16 and thereby rotates around the second pivotal axis (rotational lever axes 33) at the vehicle frontal collision, so that the pressing portion 35 of the rotational lever 21 presses down the swing pedal support member (swing arms 19, 20) and thereby the downward move of the first pivotal axis (pedal axis 28) is allowed, the pedal body 12 can be compulsively moved downward and thereby the safety of the passenger can be ensured.

Thus, since the pressing portion 35 of the rotational lever 21 presses down the swing pedal support member (swing arms 19, 20) in front of the second pivotal axis (rotational lever axes 33), the operational pedal support structure equipped with the means for compulsively moving down the pedal 11 (the pedal compulsive downward-move means) at the vehicle frontal collision can be made properly compact. Further, since the downward move of the pedal axis 28 as the first pivotal axis is allowed only in case the rotational lever 21 rotates, the simple operational pedal support structure of an automotive vehicle with the high reliability can be provided.

Moreover, since the rotational lever 21 is arranged in front of and away from the vehicle-body side member 16, assembling of an instrument panel module (not illustrated) to the vehicle body after the pedal 11 is attached can be improved. In addition, since in case the pressing portion 35 of the rotational lever 21 presses down the swing pedal support member (swing arms 19, 20) and thereby the first pivotal axis (pedal axis 28) is moved downward, the rear portion of the swing pedal support member (swing arms 19, 20) rotates in the arc shape around its front portion and the middle portion of the pedal body 12 is pivotally connected to the rear end of the push rod 8, the pedal axis 28 as the first pivotal axis is moved downward and the pedal pad 13 (pedal pressing portion) moves obliquely forward and downward at the vehicle collision. Consequently, the sufficient amount of rearward-move prevention can be ensured.

Further, the swing pedal support member (see the swing arms 19, 20) has the receiving portions 19a, 20a which are slant or curve in the vehicle width direction so as to contact the pressing portion 35 (see FIGS. 2 and 3). Thereby, the contact of the pressing portion 35 of the rotational lever 21 and the receiving portions 19a, 20a of the swing pedal support member (swing arms 19, 20) can be obtained surely, so that the compulsive downward move of the first pivotal axis (pedal axis 28) and the pedal body 12 at the vehicle collision can be obtained surely.

Moreover, the above-described downward-move restricting means comprises the holding portion 34 which is provided at the rotational lever 21 so as to hold the swing pedal support member (swing arms 19, 20) in case the rotational lever 21 does not rotate, and to release the holding of the swing pedal support member (swing arms 19, 20) in case the rotational lever 21 rotates (see FIGS. 4 and 5). Thereby, the swing pedal support member (swing arms 19, 20) can be surely held by the holding portion 34 at the normal state (the vehicle non-collision). Further, since this holding is released at the vehicle collision, the downward move of the pedal axis 28 as the first pivotal axis can be allowed, so that any erroneous operation can be prevented.

Also, the above-described downward-move restricting means comprises the slit portion 37 as the opening which extends downward from the first-pivotal-axis support portion 36 to support the first pivotal axis (pedal axis 28) in the different direction from the direction of the operational load which is applied to the first pivotal axis (pedal axis 28) in case the pedal body 12 is operated, and the restricting portion 38 which is formed between the slit portion 37 (opening) and the first-pivotal-axis support portion 36 and breaks or deforms so as to allow the first pivotal axis (pedal axis 28) to pass through them in case the downward load acting on the swing pedal support member (swing arms 19, 20), i.e., the first pivotal axis (pedal axis 28), is the specified magnitude or greater (see FIG. 5). Thereby, since the restriction portion 38 restricts the downward move of the pedal axis 28 as the first pivotal axis in case the above-described downward load is smaller than the specified magnitude, the erroneous operation of the pedal 11 dropping at the normal state (the vehicle non-collision) can be prevented surely. Meanwhile, at the vehicle frontal collision, the restricting portion 38 breaks or deforms, by receiving the downward load which is the specified magnitude or greater, and allows the first pivotal axis (pedal axis 28) to pass through the slit portion 37. Thus, the pedal 11 is moved downward compulsively, so that the rearward move of the pedal 11 can be prevented surely.

Further, the above-described downward-move restricting means restricts the downward move of the first pivotal axis (pedal axis 28) in case the downward load is less than the specified magnitude, and allows the downward move of the first pivotal axis (pedal axis 28) in case the downward load is the specified magnitude or greater (see FIGS. 1, 4 and 5).

Embodiment 2

FIGS. 11 through 15 show an operational pedal support structure of an automotive vehicle according to another embodiment. The operational pedal support structure of an automotive vehicle of the present embodiment is arranged in back of the dash panel 3 (see the previous figures) which constitutes the front portion of the vehicle compartment 5.

Figure 11:
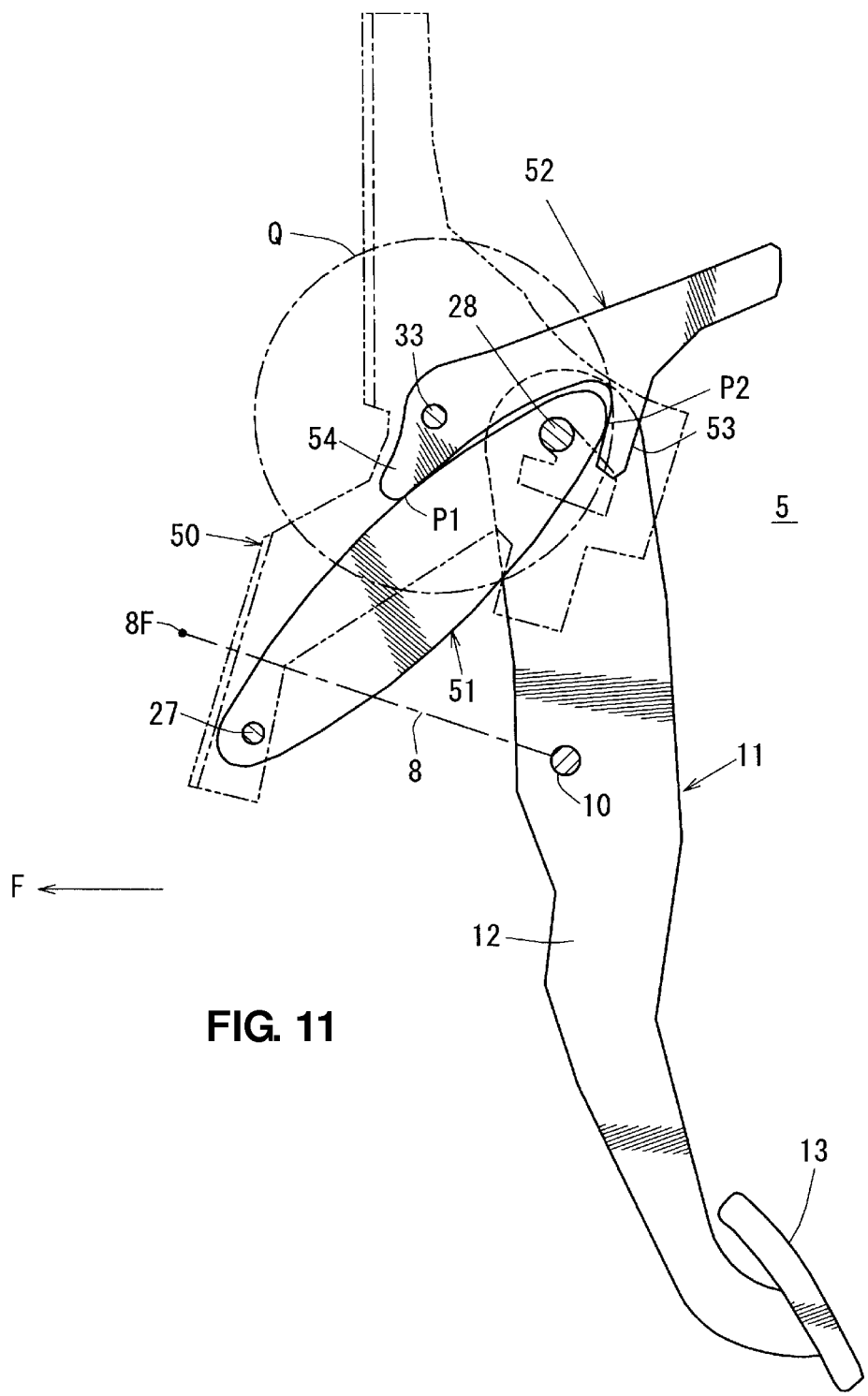
FIG. 11 is a side view showing an operational pedal support structure of an automotive vehicle according to a second embodiment.

Further, the operational pedal support structure of the present embodiment, as shown in FIG. 11, comprises a mount bracket 50 as the fixed pedal support member which is provided on the side of the dash panel 3, a swing arm 51 as the swing arm pedal support member which is supported relative to the mount bracket 50 so as to swing in the vertical direction around a pin 27 provided at its front portion and extends obliquely upward and rearward, the pedal body 12 which is supported via the pedal axis 28 as the first pivotal axis, which is arranged at a rear portion of the swing arm 51 and extends in the vehicle width direction, so as to swing around the pedal axis 28, and a rotational lever 52 which is supported at the mount bracket 50 via the rotational lever axis 33 which is positioned in front of the pedal axis 28.

The rotational lever 52 is arranged in front of the vehicle-body side member 16 (see the previous figures) so as not to be connected to this member 16, and supported at the mount bracket 50 via the rotational lever axis 33 which extends in the vehicle width direction so as to swing in the vehicle longitudinal direction. Further, in case the mount bracket 50 retreats relative to the swing arm 51 the above-described rotational lever 52 hits against the vehicle-body side member 16, and thereby this lever 52 rotates around the rotational lever axis 33 so as to press down the swing arm 51.

The above-described rotational lever axis 33 is arranged slightly above and in front of the pedal axis 28. The above-described rotational lever 52 has a holding portion 53 which holds the swing arm 51 in case the rotational lever 52 does not rotate and releases this holding of the swing arm 51 in case the rotational lever 52 rotates. Also the rotational lever 52 has a pressing portion 54 which is positioned in front of the rotational lever axis 33 and presses down the swing arm 51. Herein, the holding portion 53 is configured to elastically deform or plastically deform in case the swing arm 51 is moved down compulsively.

The swing arm 51 is formed in a slender oval shape, and contacts the rotational lever 52 at two points P1, P2 as shown in FIG. 11. That is, a front face of the holding portion 53 of the rotational lever 52 and a lower face of the pressing portion 54 contact the swing arm 51, so that the rotational lever 52 can hold the swing arm 51. Thereby, the position of the pedal axis 28 as the first pivotal axis at the normal state (vehicle non-collision) can be held.

Figure 12:
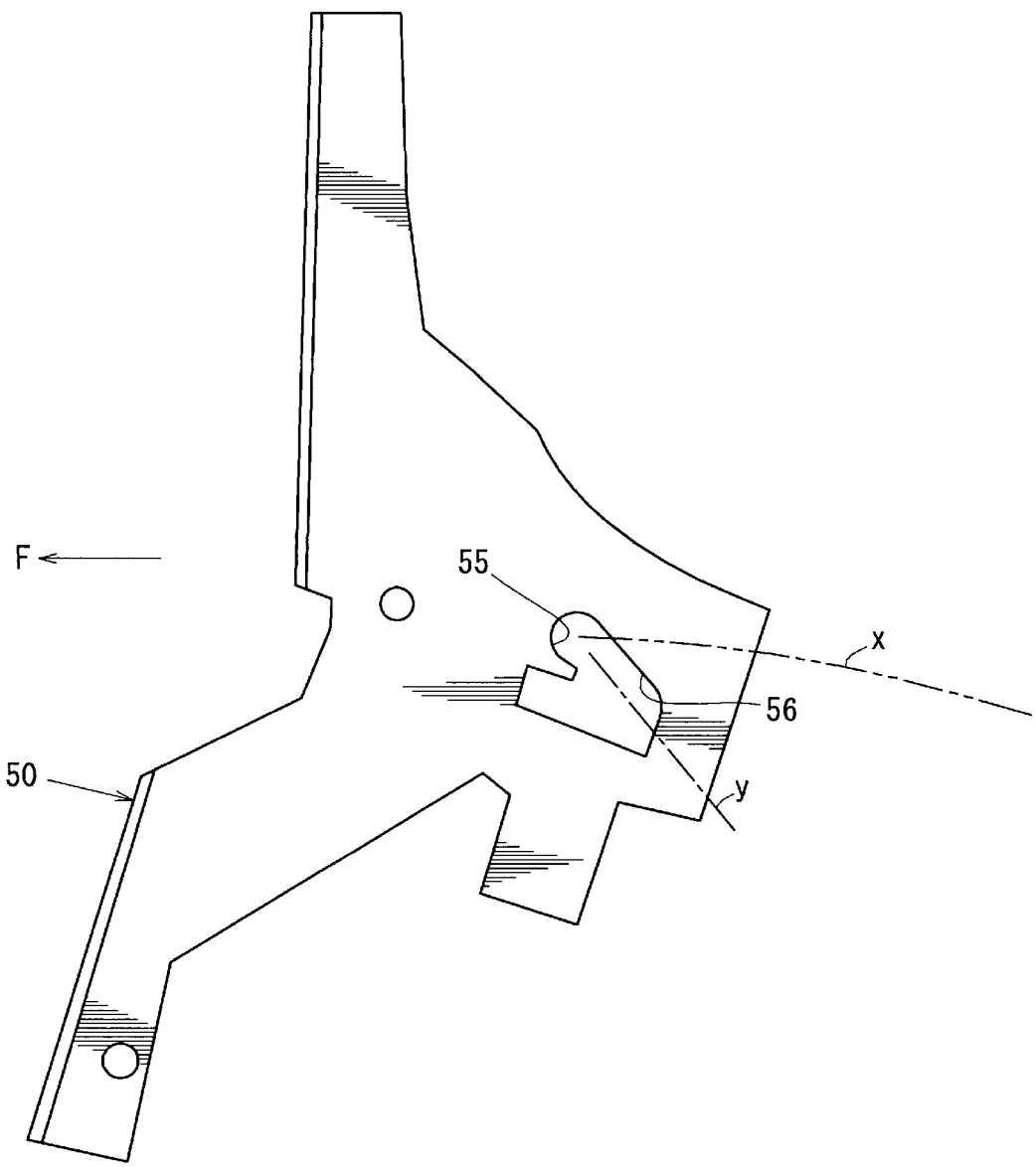
FIG. 12 is an enlarged side view of a fixed pedal support member of FIG. 11.

The above-described mount bracket 50 has a first-pivotal-axis support portion 55 to support the pedal axis 28 and a slot portion 56 which connects to the first-pivotal-axis support portion 55 as shown in FIG. 12. Herein, the forming direction y of the slot portion 56 extends downward, having some angles relative to the direction of the operational load (the direction of the arrow x in FIG. 12) applied to the pedal axis 28 in case the pedal body 12 is operated.

As shown in FIG. 11, the holding face (front face) of the holding portion 53 of the rotational lever 52 is slanted downward and forward relative to the peripheral direction of the rotational locus Q of the rotational lever 52 so that the rotational lever 52 can be biased toward the holding direction in case the swing arm 51 swings downward. Further, the above-described pressing portion 54 is formed in front of and below the rotational lever axis 33 supporting the rotational lever 52 so that the pressing portion 54 can press down the swing arm 51. In the second embodiment, the holding portion 53 constitutes the downward-move restricting means to allow the downward move of the pedal axis 28 only in case the rotational lever 52 rotates.

Figure 13:
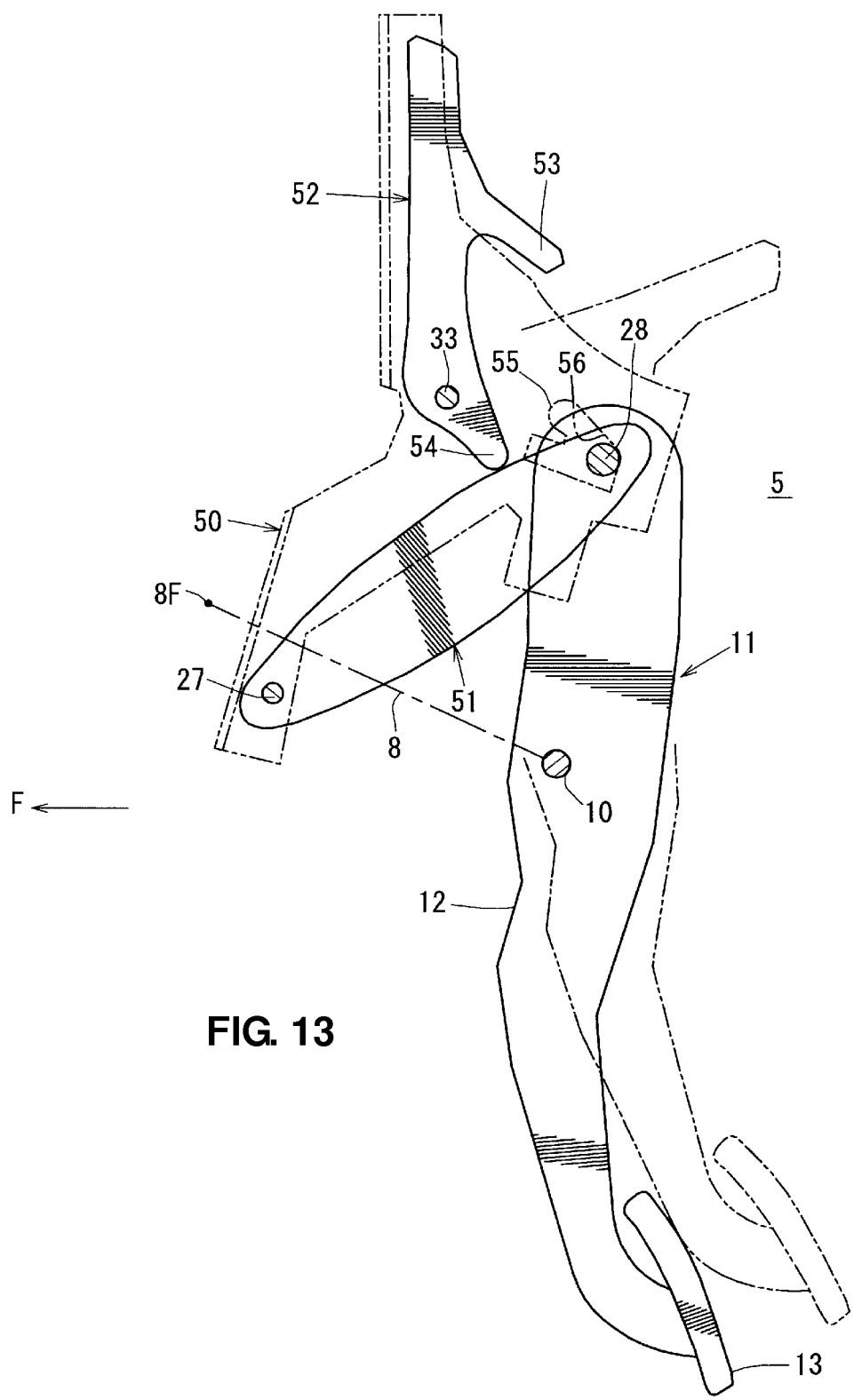
FIG. 13 is a side view showing a case of the pedal compulsive downward-move.

FIGS. 11 and 13 are side views showing the state in which the brake pedal 11 is not operated (pressed). In case the vehicle has the frontal collision from the normal state (vehicle non-collision) shown in FIG. 11, the power train in the engine room 4 is pushed rearward, and then the dash panel 3 (see the previous figures) retreats. Thereby, the rear portion of the rotational lever 21 hits against the vehicle-body side member 16 (see the previous figures), and the rotational lever 52 rotates counterclockwise around the rotational lever axis 33 as shown in FIG. 13. Consequently, the rotational lever 52 compulsively presses down the swing arm 51 with the pressing portion 54, releasing the holding of the swing arm 51 by the holding portion 53.

Thus, the pedal axis 28 as the first pivotal axis which is provided a free end portion of the swing arm 51 moves downward along the slot portion 56 of the mount bracket 50, so that the pedal body 12 rotates around the axis 10 of the push rod 8 so that its upper end moves rearward and the pedal pad 13 moves forward. Thereby, the rearward move of the brake pedal 11 can be prevented.

Further, the dash panel 3 moving rearward at the vehicle collision pushes rearward the pressing portion 54 of the rotational lever 52, so that the pressing portion 54 rotates the swing arm 51 further downward surely. Accordingly, the rearward move of the brake pedal 11 can be prevented more surely.

Figure 14:
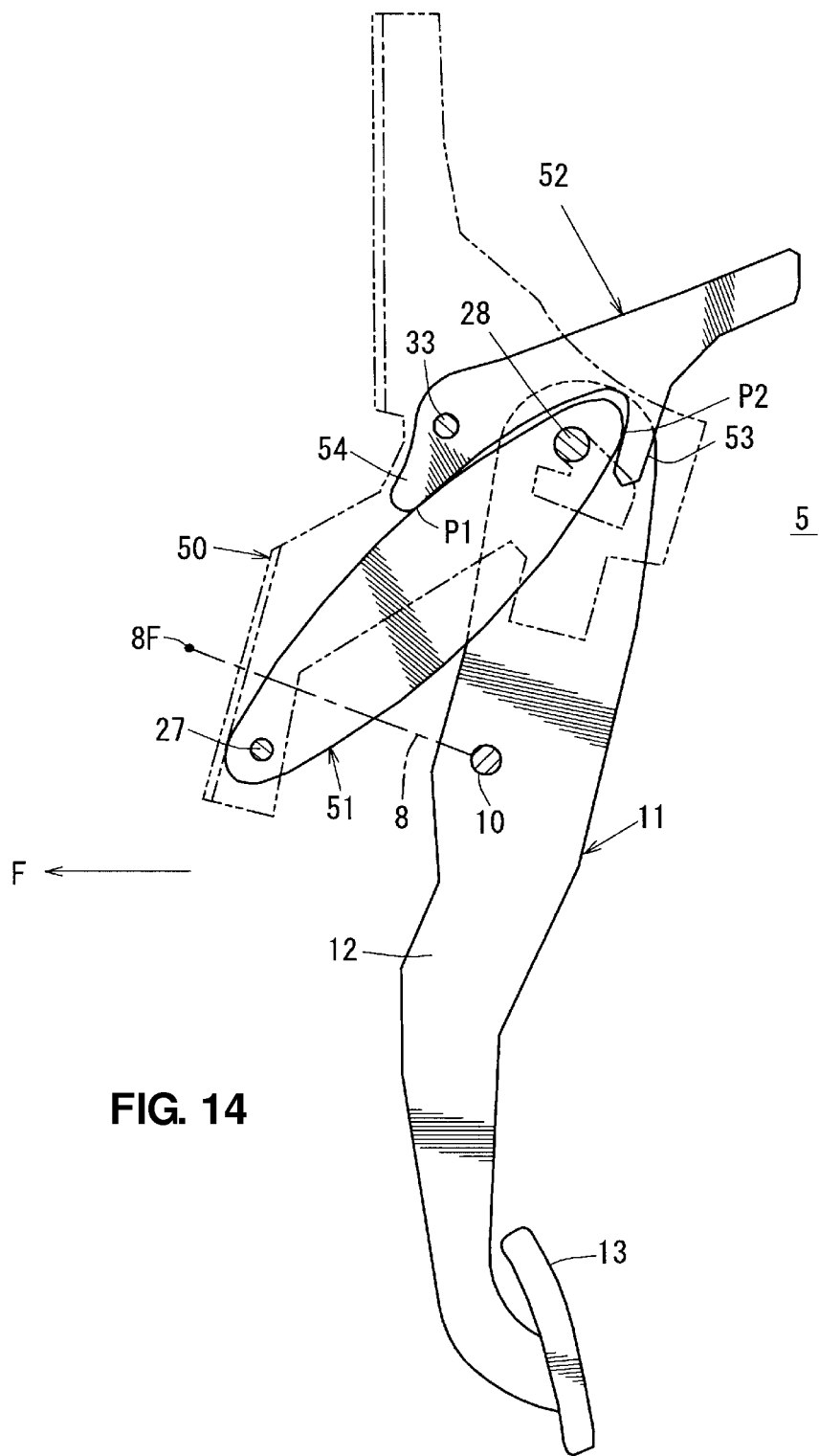
FIG. 14 is a side view showing a state of vehicle non-collision in case the pedal has been pressed the most.
Figure 15:
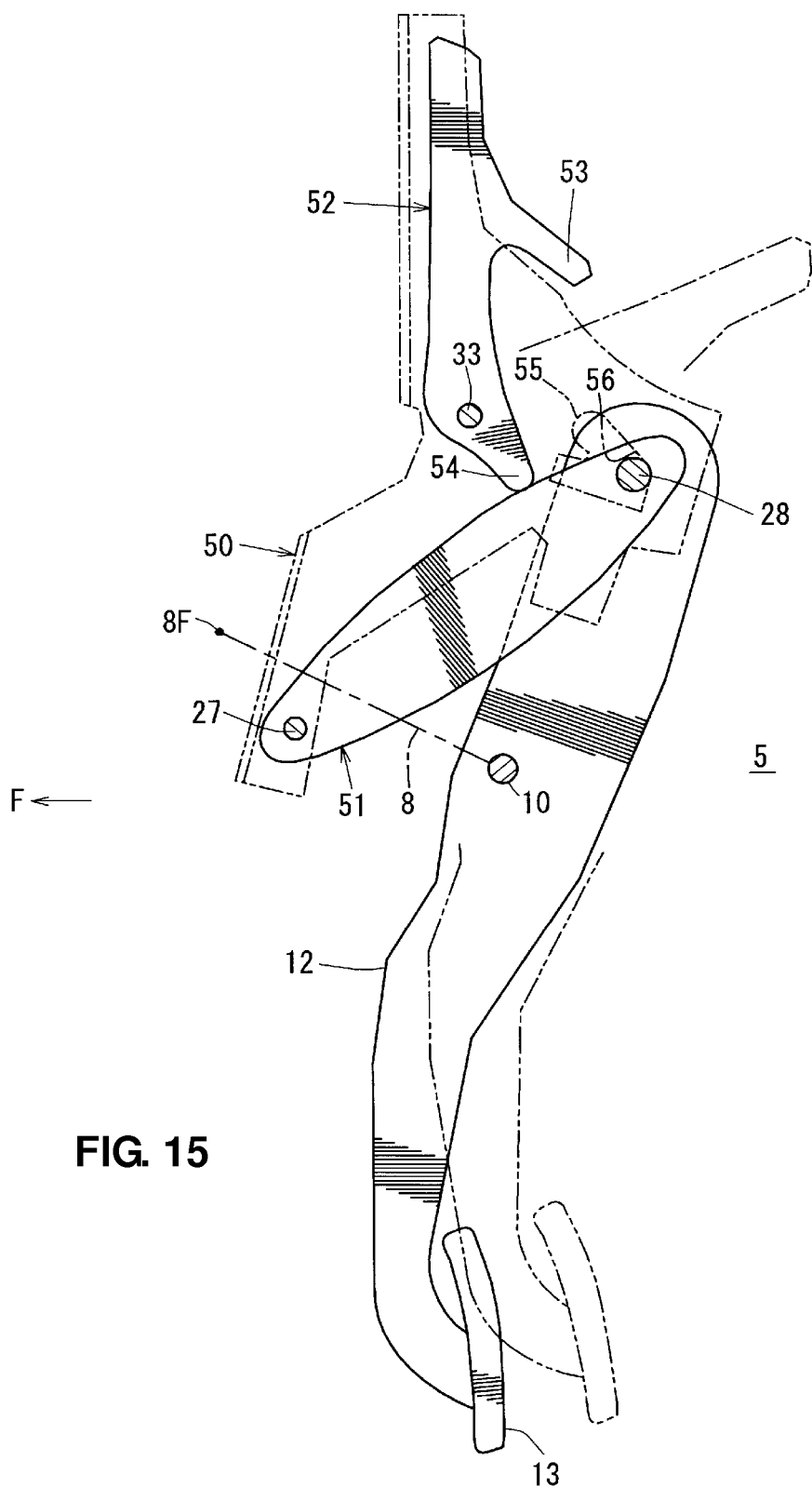
FIG. 15 is a side view showing a pedal compulsive downward-move in case the pedal has been pressed the most.
Figure 16:
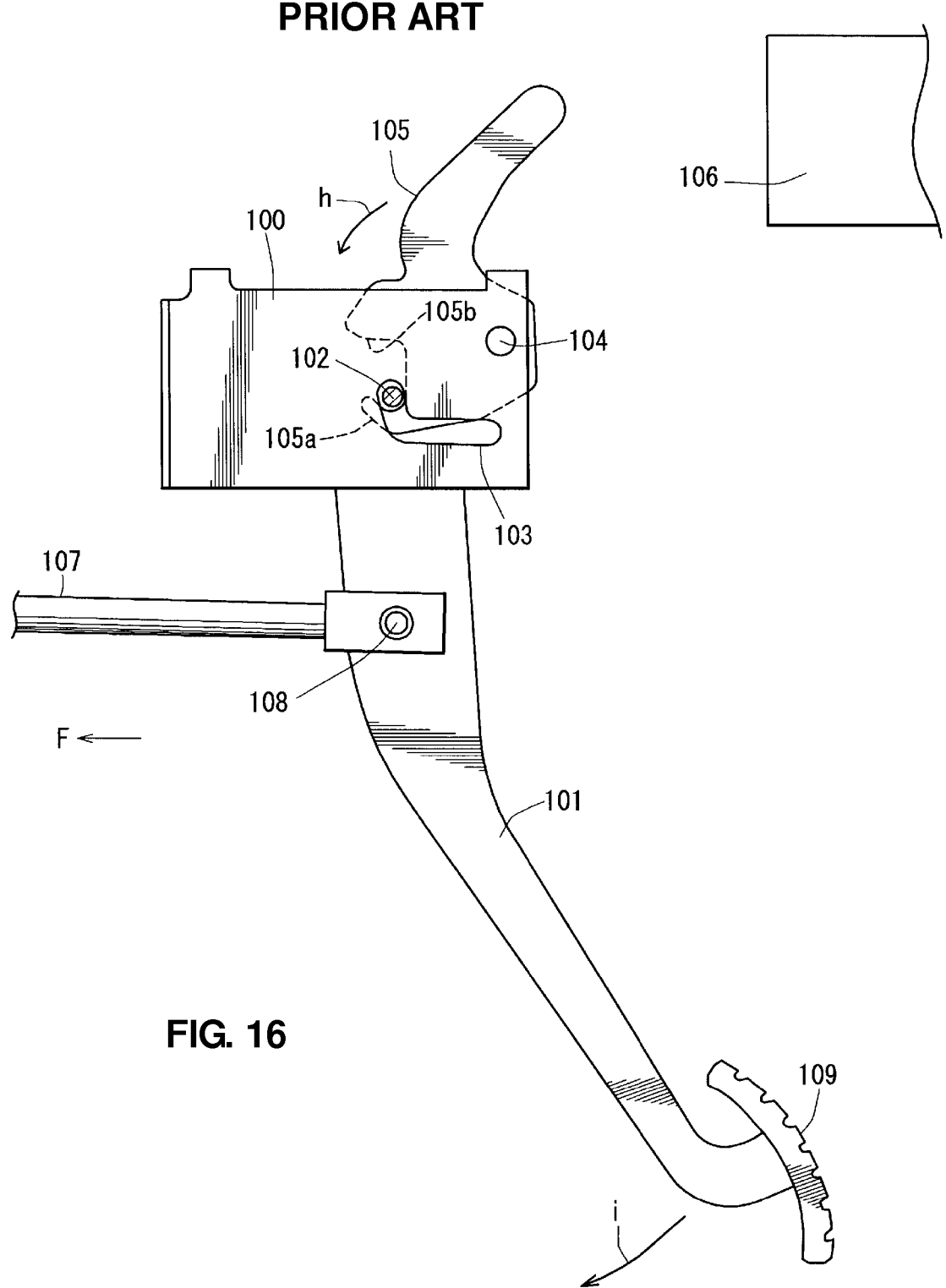
FIG. 16 is a side view showing an operational pedal support structure of an automotive vehicle according to a conventional structure.
Figure 17:
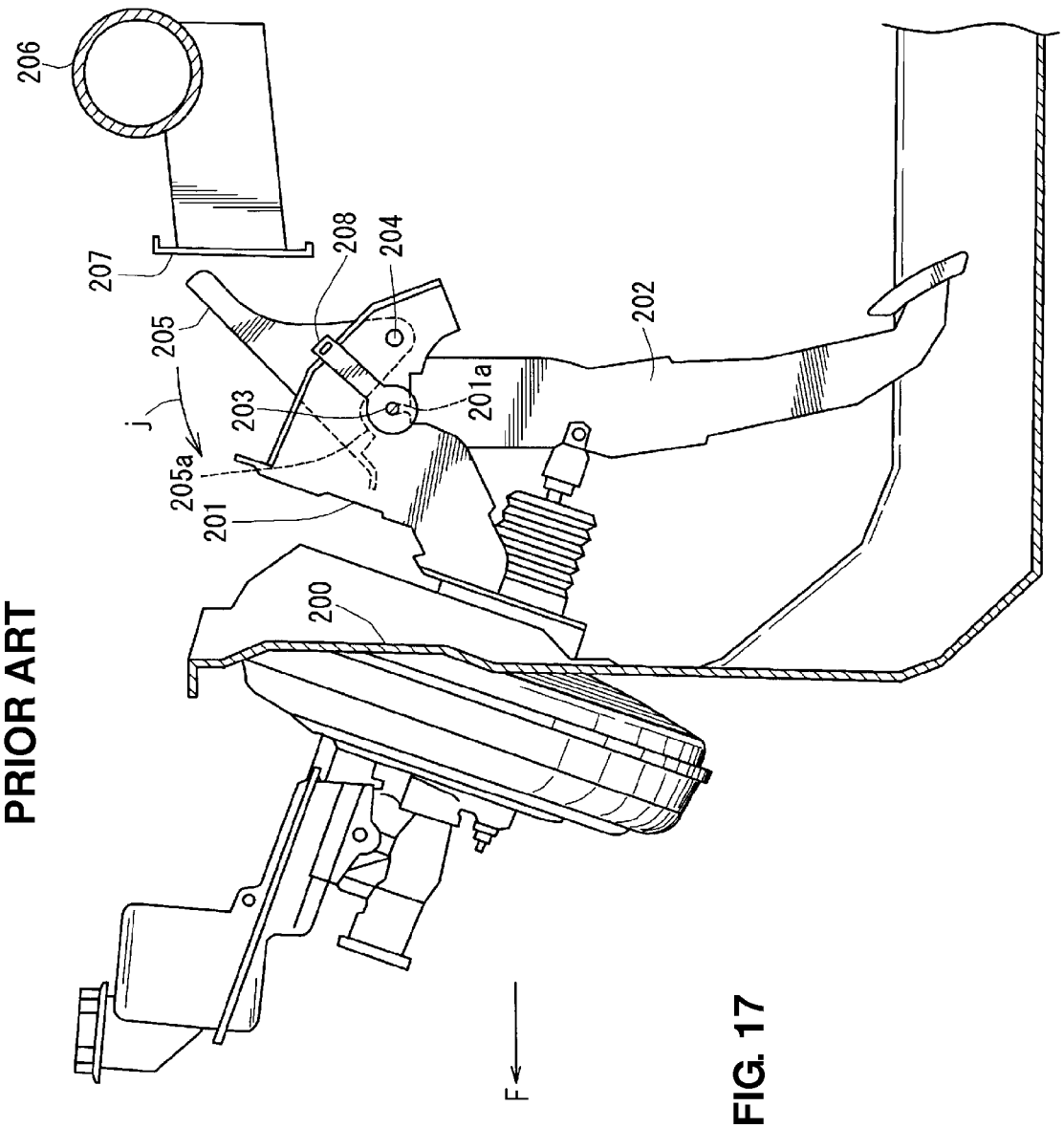
FIG. 17 is a side view showing an operational pedal support structure of an automotive vehicle according to another conventional structure.
Figure 18:
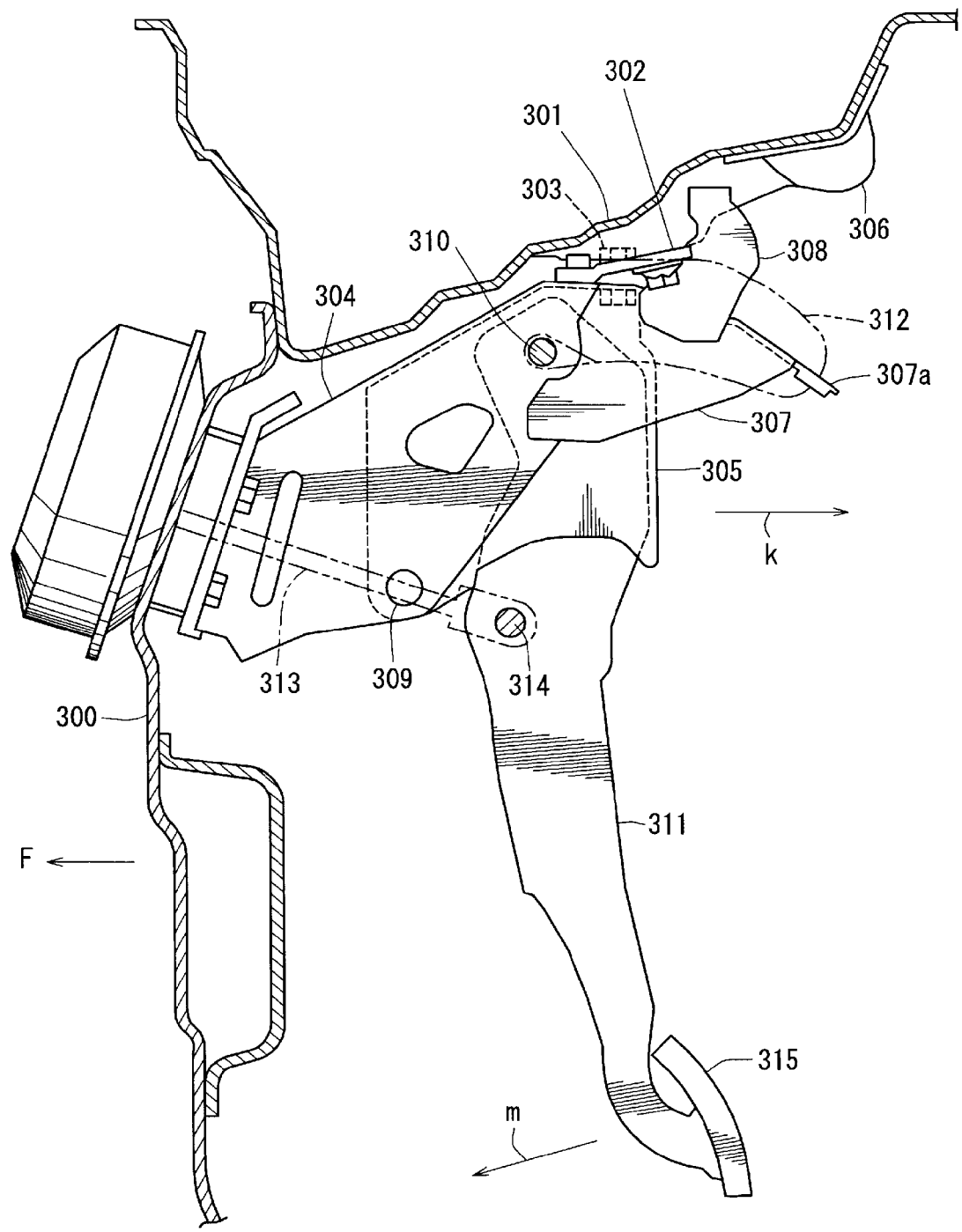
FIG. 18 is a side view showing an operational pedal support structure of an automotive vehicle according to further another conventional structure.
Figure 19:
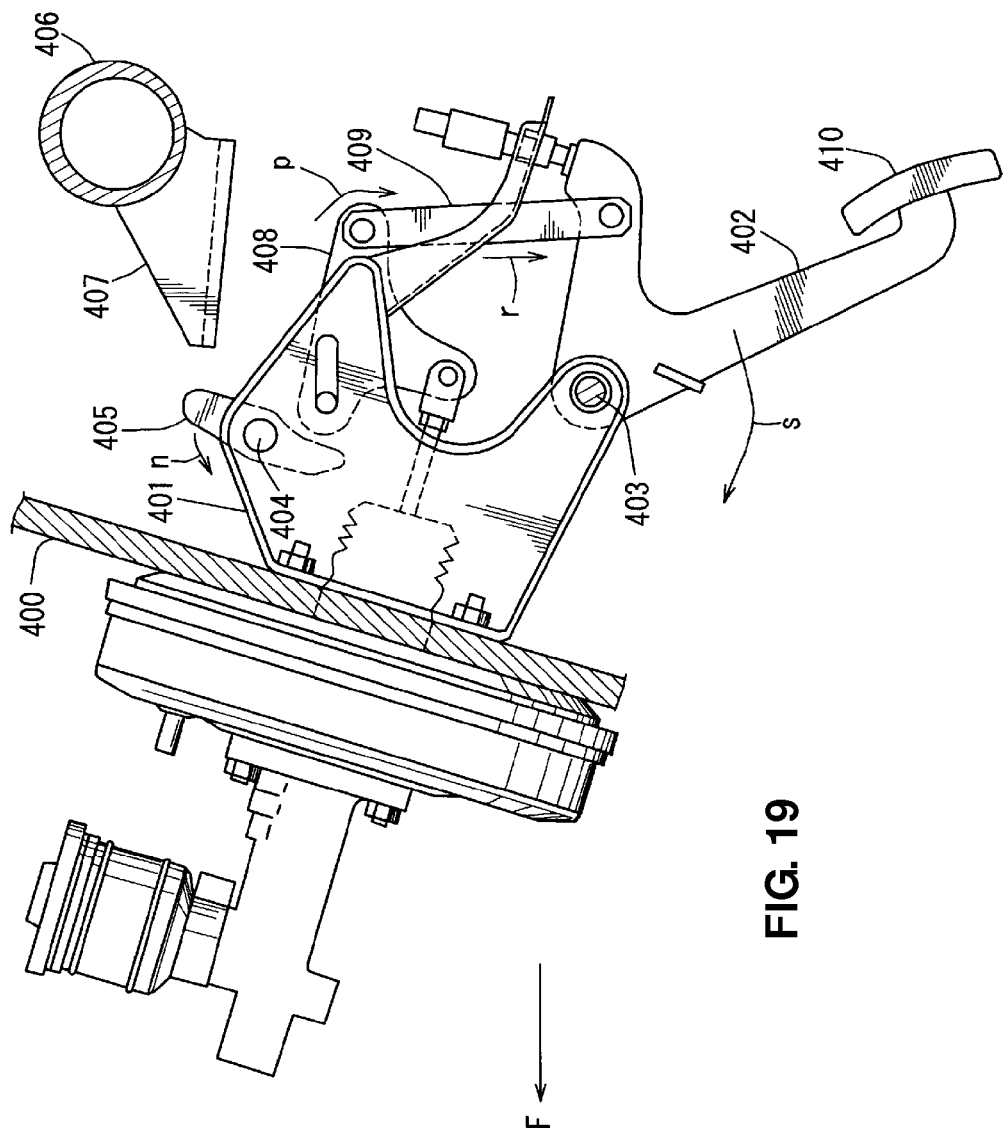
FIG. 19 is a side view showing an operational pedal support structure of an automotive vehicle according to further another conventional structure.

FIGS. 14 and 15 are side views showing the state in which the brake pedal is pressed the most. At the vehicle frontal collision, the state changes from FIG. 14 to FIG. 15, so that the rearward move of the brake pedal 11 can be prevented. Herein, the operations according to the change of the state from FIG. 14 to FIG. 15 are substantially the same as that from FIG. 11 to FIG. 14 described above, so the same portions are denoted by the same reference characters and their specific descriptions are omitted here.

As described above, the operational pedal support structure of an automotive vehicle according to the second embodiment shown in FIGS. 11-15, which is arranged in back of the dash panel 3 (see the previous figures) constituting the front portion of the vehicle compartment 5, comprises the fixed pedal support member (see the mount bracket 50) provided on the side of the dash panel 3, the swing pedal support member (see the swing arm 51) supported relative to the dash panel 3 so as to swing in the vertical direction around their front portions and extending obliquely upward and rearward, the first pivotal axis (see the pedal axis 28) provided at the rear portions of the swing pedal support member (swing arm 51) and extending in the vehicle width direction, the pedal body 12 supported at the swing pedal support member (swing arm 51) via the first pivotal axis (pedal axis 28) so as to swing around the first pivotal axis (pedal axis 28), the vehicle-body side member 16 (see the previous figures) provided in back of and away from the fixed pedal support member (mount bracket 50) and fixed to the vehicle body, the rotational lever 21 provided in front of and away from the vehicle-body side member 16, the rotational lever 52 being supported at the fixed pedal support member (mount bracket 50) via the second pivotal axis (see the rotational lever axis 33) extending in the vehicle width direction so as to swing in the vehicle longitudinal direction around the second pivotal axis (rotational lever axis 33), the rotational lever 52 contacting the vehicle-body side member 16 and rotating around the second pivotal axis (rotational lever axis 33) so as to press down the swing pedal support member (swing arm 51) downward in case the fixed pedal support member (mount bracket 50) moves rearward, the downward-move restricting means (see the holding portion 53) to allow the downward move of the first pivotal axis (pedal axis 28) only in case the rotational lever 52 rotates, and the pressing portion 54 provided at the rotational lever 21 so as to press down the swing pedal support member (swing arm 51), the pressing portion 54 being positioned in front of the second pivotal axis (rotational lever axis 33) (see FIG. 11).

According to the above-described structure, since the rotational lever 52 hits against the vehicle-body side member 16 and thereby rotates around the second pivotal axis (rotational lever axis 33) at the vehicle frontal collision, so that the pressing portion 54 of the rotational lever 52 presses down the swing pedal support member (swing arm 51) and thereby the downward move of the first pivotal axis (pedal axis 28) is allowed, the pedal body 12 can be compulsively moved downward and thereby the safety of the passenger can be ensured.

Thus, since the pressing portion 54 of the rotational lever 52 presses down the swing pedal support member (swing arm 51) in front of the second pivotal axis (rotational lever axis 33), the operational pedal support structure equipped with the means for compulsively moving down the pedal 11 (the pedal compulsive downward-move means) at the vehicle frontal collision can be made properly compact. Further, since the downward move of the pedal axis 28 as the first pivotal axis is allowed only in case the rotational lever 52 rotates, the simple operational pedal support structure of an automotive vehicle with the high reliability can be provided.

Moreover, since the rotational lever 52 is arranged in front of and away from the vehicle-body side member 16, assembling of an instrument panel module to the vehicle body after the pedal 11 is attached can be improved. In addition, since in case the pressing portion 54 of the rotational lever 52 presses down the swing pedal support member (swing arm 51) and thereby the first pivotal axis (pedal axis 28) is moved downward, the rear portion of the swing pedal support member (swing arm 51) rotates in the arc shape around its front portion and the middle portion of the pedal body 12 is pivotally connected to the rear end of the push rod 8, the pedal axis 28 as the first pivotal axis is moved downward and the pedal pad 13 (pedal pressing portion) moves obliquely forward and downward at the vehicle collision. Consequently, the sufficient amount of rearward-move prevention can be ensured.

The other structures, operations and effects of the second embodiment shown in FIGS. 11 through 15 are substantially the same as those of the first embodiment, so the same portions are denoted by the same reference characters and their specific descriptions are omitted here.

The present invention should not be limited to the above-described embodiments, and any other modifications and improvements may be applied within the scope of a sprit of the present invention.

What is claimed is:

1. An operational pedal support structure of an automotive vehicle, which is arranged in back of a dash panel constituting a front portion of a vehicle compartment, comprising:
   a fixed pedal support member provided on the side of the dash panel;
   a swing pedal support member supported relative to the dash panel so as to swing in a vertical direction around a front portion thereof and extending obliquely upward and rearward;
   a first pivotal axis provided at a rear portion of the swing pedal support member and extending in a vehicle width direction;
   a pedal body supported at the swing pedal support member via the first pivotal axis so as to swing around the first pivotal axis which constitutes a pedal-operation swing axis in a normal pedal-operational state;
   a vehicle-body side member provided in back of and away from the fixed pedal support member and fixed to a vehicle body;
   a rotational lever provided in front of and away from the vehicle-body side member, the rotational lever being supported at the fixed pedal support member via a second pivotal axis extending in the vehicle width direction so as to swing in a vehicle longitudinal direction around the second pivotal axis, the rotational lever contacting the vehicle-body side member and rotating around the second pivotal axis so as to press down the swing pedal support member downward, thereby moving the front pivotal axis downward, in case the fixed pedal support member moves rearward;
   a downward-move restricting means to allow a downward move of the first pivotal axis only in case the rotational lever rotates; and
   a pressing portion provided at the rotational lever so as to press down the swing pedal support member, thereby allowing the downward move of the first pivotal axis and enabling the pedal body to be compulsively moved downward, the pressing portion being positioned in front of the second pivotal axis.

2. The operational pedal support structure of an automotive vehicle of claim 1, wherein said swing pedal support member has a receiving portion which is slant or curves in the vehicle width direction so as to contact said pressing portion.

3. The operational pedal support structure of an automotive vehicle of claim 2, wherein said downward-move restricting means comprises a holding portion which is provided at said rotational lever so as to hold said swing pedal support member in case the rotational lever does not rotate so that the swing pedal support member cannot swing downward, and to release said holding of the swing pedal support member in case the rotational lever rotates so that said downward move of the first pivotal axis can be allowed.

4. The operational pedal support structure of an automotive vehicle of claim 3, wherein said second pivotal axis is positioned above said first pivotal axis and at the same location as the first pivotal axis in the vehicle longitudinal direction or in front of the first pivotal axis.

5. The operational pedal support structure of an automotive vehicle of claim 4, wherein said downward-move restricting means restricts the downward move of the first pivotal axis in case a downward load acting on the swing pedal support member is less than a specified magnitude, and allows the downward move of the first pivotal axis in case the downward load is the specified magnitude or greater.

6. The operational pedal support structure of an automotive vehicle of claim 5, wherein said downward-move restricting means comprises an opening which opens from a first-pivotal-axis support portion to support said first pivotal axis in a different direction from a direction of an operational load which is applied to the first pivotal axis in case said pedal body is operated, and a restricting portion which is formed between said opening and the first-pivotal-axis support portion and deforms so as to allow the first pivotal axis to pass therethrough in case the downward load is the specified magnitude or greater.

7. The operational pedal support structure of an automotive vehicle of claim 6, wherein said opening comprises a slit portion which extends from the first-pivotal-axis support portion more downward than the direction of the operational load which is applied to the first pivotal axis in case the pedal body is operated.

8. The operational pedal support structure of an automotive vehicle of claim 7, wherein said pressing portion of the rotational lever contacts a specified portion of said swing pedal support member which is positioned in front of said first pivotal axis in case the rotational lever rotates.

9. The operational pedal support structure of an automotive vehicle of claim 1, wherein said downward-move restricting portion holds said swing pedal support member in case the rotational lever does not rotate so that the swing pedal support member cannot swing downward, and releases said holding of the swing pedal support member in case the rotational lever rotates so that said downward move of the first pivotal axis can be allowed.

10. The operational pedal support structure of an automotive vehicle of claim 1, wherein said downward-move restricting means restricts the downward move of the first pivotal axis in case a downward load acting on the swing pedal support member is less than a specified magnitude, and allows the downward move of the first pivotal axis in case the downward load acting is the specified magnitude or greater.

11. The operational pedal support structure of an automotive vehicle of claim 10, wherein said downward-move restricting means comprises an opening which opens from a first-pivotal-axis support portion to support said first pivotal axis in a different direction from a direction of an operational load which is applied to the first pivotal axis in case said pedal body is operated, and a restricting portion which is formed between said opening and the first-pivotal-axis support portion and deforms so as to allow the first pivotal axis to pass therethrough in case the downward load is the specified magnitude or greater.

12. The operational pedal support structure of an automotive vehicle of claim 11, wherein said opening comprises a slit portion which extends from the first-pivotal-axis support portion more downward than the direction of the operational load which is applied to the first pivotal axis in case the pedal body is operated.

13. The operational pedal support structure of an automotive vehicle of claim 1, wherein said pressing portion of the rotational lever contacts a specified portion of said swing pedal support member which is positioned in front of said first pivotal axis in case the rotational lever rotates.

14. The operational pedal support structure of an automotive vehicle of claim 1, wherein said downward-move restricting means comprises a holding portion which is provided at said rotational lever so as to hold said swing pedal support member in case the rotational lever does not rotate so that the swing pedal support member cannot swing downward, and to release said holding of the swing pedal support member in case the rotational lever rotates so that said downward move of the first pivotal axis can be allowed, the holding portion deforming in case a downward load acting on the swing pedal support member is the specified magnitude or greater so as to release said holding of the swing pedal support member.

15. An operational pedal support structure of an automotive vehicle, which is arranged in back of a dash panel constituting a front portion of a vehicle compartment, comprising:

a fixed pedal support member provided on the side of the dash panel;

a swing pedal support member supported relative to the dash panel so as to swing in a vertical direction around a front portion thereof and extending obliquely upward and rearward;

a pedal body supported via a first pivotal axis which is provided at a rear portion of the swing pedal support member and extends in a vehicle width direction so as to swing around the first pivotal axis which constitutes a pedal-operation swing axis in a normal pedal-operational state;

a vehicle-body side member provided on the side of an instrument panel member in back of and away from the fixed pedal support member and fixed to a vehicle body;

a rotational lever provided in front of and away from the vehicle-body side member, the rotational lever being supported at the fixed pedal support member via a second pivotal axis extending in the vehicle width direction so as to swing in a vehicle longitudinal direction around the second pivotal axis, the rotational lever contacting the vehicle-body side member and rotating around the second pivotal axis so as to press down the swing pedal support member downward, thereby moving the first pivotal axis downward, in case the fixed pedal support member moves rearward, the second pivotal axis being positioned above said first pivotal axis and at the same location as the first pivotal axis in the vehicle longitudinal direction or in front of the first pivotal axis; and a holding portion which is provided at said rotational lever so as to hold said swing pedal support member in case the rotational lever does not rotate, and to release said holding of the swing pedal support member in case the rotational lever rotates, thereby allowing the downward move of the first pivotal axis and enabling the pedal body to be compulsively moved downward.

* * * * *